United States Patent
Lee et al.

(10) Patent No.: US 9,930,531 B2
(45) Date of Patent: Mar. 27, 2018

(54) MULTIMEDIA MESSAGE SERVICE METHOD AND SYSTEM

(71) Applicant: Samsung Electronics Co., Ltd., Gyeonggi-do (KR)

(72) Inventors: Kyung-Tak Lee, Gyeonggi-do (KR); Joon-Goo Park, Gyeonggi-do (KR); Sang-Kyung Sung, Seoul (KR); Thirumalai Echampadi Seshadri, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/061,519

(22) Filed: Mar. 4, 2016

(65) Prior Publication Data
US 2016/0192197 A1    Jun. 30, 2016

Related U.S. Application Data

(63) Continuation of application No. 14/302,136, filed on Jun. 11, 2014, now Pat. No. 9,282,101, which is a (Continued)

(30) Foreign Application Priority Data

Apr. 6, 2005    (KR) .................. 10-2005-0028743

(51) Int. Cl.
*H04W 4/14* (2009.01)
*H04W 12/08* (2009.01)
(Continued)

(52) U.S. Cl.
CPC .......... *H04W 12/08* (2013.01); *H04L 12/189* (2013.01); *H04L 51/10* (2013.01); *H04L 63/10* (2013.01);
(Continued)

(58) Field of Classification Search
CPC ....... H04L 63/10; H04L 12/189; H04L 51/10; H04L 63/102; H04W 4/12; H04W 8/18; H04W 12/06; H04W 12/08
(Continued)

(56) References Cited

U.S. PATENT DOCUMENTS

| 5,768,347 A | 6/1998 | Beyda |
| 6,934,535 B2 | 8/2005 | Pyhalammi |

(Continued)

FOREIGN PATENT DOCUMENTS

| CN | 1299203 | 6/2001 |
| GB | 2 399 983 | 9/2004 |

(Continued)

OTHER PUBLICATIONS

Part 2, Plural users share data in a highly efficient way, Aug. 1, 2000.
(Continued)

*Primary Examiner* — Phuoc H Doan
(74) *Attorney, Agent, or Firm* — The Farrell Law Firm, P.C.

(57) ABSTRACT

Disclosed is a method of sharing multimedia contents, by a server, including storing the multimedia contents, receiving an establishment request configured to establish one of a plurality of access modes for the multimedia contents from a first terminal, establishing an access mode according to the establishment request for the multimedia contents, receiving an access request for the multimedia contents stored in the server from at least one second terminal, determining whether the at least one second terminal is allowed to access the multimedia message based on the access mode, and transmitting the multimedia contents, wherein the access mode includes at least one of a private mode for access by only the first terminal, a restricted mode for access by the at least one second terminal, and a public mode for access by all terminals.

20 Claims, 15 Drawing Sheets

Related U.S. Application Data continuation of application No. 11/910,700, filed as application No. PCT/KR2006/001173 on Mar. 30, 2006, now Pat. No. 8,787,881.

(51) Int. Cl.
*H04L 12/18* (2006.01)
*H04L 29/06* (2006.01)
*H04W 4/12* (2009.01)
*H04L 12/58* (2006.01)
*H04W 8/18* (2009.01)
*H04W 12/06* (2009.01)

(52) U.S. Cl.
CPC ............ *H04L 63/102* (2013.01); *H04W 4/12* (2013.01); *H04W 8/18* (2013.01); *H04W 12/06* (2013.01)

(58) Field of Classification Search
USPC ....... 455/412.1, 414.1, 466; 707/600, 104.1; 709/206, 231
See application file for complete search history.

(56) References Cited

U.S. PATENT DOCUMENTS

| | | |
|---|---|---|
| 7,185,360 B1 | 2/2007 | Anton et al. |
| 8,787,876 B1* | 7/2014 | Cazanas ................. H04M 3/38 |
| | | 455/411 |
| 2003/0065802 A1* | 4/2003 | Vitikainen ............. H04L 29/06 |
| | | 709/231 |
| 2003/0078890 A1* | 4/2003 | Schmidt ................. G06F 21/10 |
| | | 705/51 |
| 2003/0154300 A1 | 8/2003 | Mostafa |
| 2004/0205147 A1 | 10/2004 | Fukuzato |
| 2005/0041150 A1* | 2/2005 | Gewickey ........ H04N 21/23614 |
| | | 348/565 |
| 2005/0193015 A1* | 9/2005 | Logston ............ G06F 17/30058 |
| 2005/0273489 A1 | 12/2005 | Pecht et al. |
| 2006/0019637 A1 | 1/2006 | Becker et al. |
| 2006/0250987 A1 | 11/2006 | White et al. |
| 2009/0291697 A1* | 11/2009 | Kit Tam ................. H04W 4/18 |
| | | 455/466 |

FOREIGN PATENT DOCUMENTS

| | | |
|---|---|---|
| JP | 2000-029830 | 1/2000 |
| JP | 2002-271854 | 9/2002 |
| JP | 2004-206226 | 7/2004 |
| JP | 2004-260274 | 9/2004 |
| KR | 1020000031303 | 6/2000 |
| KR | 1020010064809 | 7/2001 |
| KR | 1020040004833 | 1/2004 |
| KR | 1020040084395 | 10/2004 |
| KR | 1020040101616 | 12/2004 |
| KR | 1020050003587 | 1/2005 |
| WO | WO 03/030507 | 4/2003 |
| WO | WO 2004/071060 | 8/2004 |

OTHER PUBLICATIONS

European Search Report dated Apr. 15, 2015 issued in counterpart application No. 06716549.8-1870.

\* cited by examiner

MULTIMEDIA MESSAGE SERVICE METHOD AND SYSTEM

PRIORITY

This application is a Continuation Application of U.S. patent application Ser. No. 14/302,136, filed on Jun. 11, 2014, which is a continuation of U.S. patent application Ser. No. 11/910,700, filed on Oct. 4, 2007, now U.S. Pat. No. 8,787,881, issued on Jul. 22, 2014, which is a National Phase Entry of PCT International Application No. PCT/KR2006/001173, which was filed on Mar. 30, 2006, and claims priority to Korean Patent Application No. 10-2005-0028743, which was filed on Apr. 6, 2005, the contents of each of which are incorporated herein by reference.

BACKGROUND OF THE INVENTION

1. Field of the Invention

The present invention relates to multimedia message service in a mobile communication system, and more particularly to a multimedia message service method and system enabling a plurality of mobile terminals to share multimedia messages.

2. Description of the Related Art

Currently, mobile communication systems provide a multimedia message service (MMS), which enables transmission and reception of multimedia messages including much richer content, such as a large amount of text, audio, images and video, as well as an initial service of transmitting and receiving a short text message of about 150 bytes.

The multimedia message is transmitted/received between mobile terminals according to the request of a client, or may be stored in a multimedia message box. The transmission/reception of the multimedia message between the mobile terminals is achieved in such a manner that when a transmission-side terminal transmits the multimedia message together with the address of a recipient-side terminal, an MMS relay/server receives the multimedia message and transmits the multimedia message to the recipient-side terminal with reference to the address of the recipient-side terminal which is included in the received multimedia message. The MMS relay/server is connected to a mobile communication network, and performs a series of operations concerning the MMS. A multimedia message is stored in the multimedia message box in such a manner that when a specific mobile terminal transmits a multimedia message to be stored in an MMS relay/server while requesting storage of the multimedia message, the MMS relay/server receives and stores the multimedia message in the multimedia message box storage area of a client account for the specific mobile terminal.

The flow of messages according to a procedure of transmitting/receiving a multimedia message between mobile terminals during the above-mentioned MMS is shown in FIG. 1. FIG. 1 is a view illustrating the flow of messages based on the conventional multimedia message service. A first mobile terminal 1 is a mobile terminal for a client requesting transmission of a predetermined multimedia message, and a second mobile terminal 7 is a recipient-side terminal for receiving the predetermined multimedia message. A first MMS relay/server 3 is connected to the first mobile terminal 1, and a second MMS relay/server 5 is a server connected to the second mobile terminal 7.

In step 101, the first mobile terminal 1 transmits an MM1-submit.REQ message including the predetermined multimedia message to the first MMS relay/server 3, thereby requesting that the predetermined multimedia message is transmitted to the second mobile terminal 7. When the first MMS relay/server 3 receives the MM1_submit.REQ message, the first MMS relay/server 3 transmits an MM1_submit.RES message to the first mobile terminal 1 in step 103, thereby notifying the first mobile terminal 1 that the first MMS relay/server 3 has received the MM1_submit.REQ message, and then performs step 105. In step 105, the first MMS relay/server 3 requests transmission of the predetermined multimedia message to the second MMS relay/server 5, by transmitting an MM4_forward.REQ message to the second MMS relay/server 5. In step 107, the second MMS relay/server 5 transmits an MM4_forward.RES message to the first MMS relay/server 3 in response to the MM4_forward.REQ message, thereby accepting that the predetermined multimedia message is transmitted to the second mobile terminal 7, and then performs step 109. In step 109, the second MMS relay/server 5 notifies the second mobile terminal 7 that the predetermined multimedia message has arrived and stored in a temporary storage area of the second MMS relay/server 5, by transmitting an MM1_notification.REQ message to the second mobile terminal 7. In step 111, the second mobile terminal 7 transmits an MM1_notification.RES message to the second MMS relay/server 5 in response to the MM1_notification.REQ message, and then performs step 113. In step 113, the second mobile terminal 7 transmits an MM1_retrieve.REQ message to the second MMS relay/server 5, thereby requesting the second MMS relay/server 5 to retrieve the predetermined multimedia message. In step 115, the second MMS relay/server 5 transmits an MM1_retrieve.RES message including the predetermined multimedia message to the second mobile terminal 7 in response to the MM1_retrieve.REQ message, and then step 117 is performed. In step 117, the second mobile terminal 7 acknowledges the reception of the MM1_retrieve.RES message by transmitting an MM1_acknowledgement.REQ message to the second MMS relay/server 5.

The transmission and reception of a multimedia message between mobile terminals is achieved through the above-mentioned message transaction.

As described above, the conventional multimedia message service enables mobile terminals to directly transmit/receive multimedia messages therebetween, and enables the multimedia messages to be stored in a multimedia message box. However, according to the conventional multimedia message service, although multimedia messages can be directly transmitted between mobile terminals, the mobile terminals cannot share the multimedia messages. In addition, the conventional multimedia message service does not provide a service of allowing other users to share multimedia messages stored in a multimedia message box. For this reason, a transmission-side mobile terminal must transmit a multimedia message to each recipient-side mobile terminal one by one in order to allow a plurality of users to share the multimedia message, which causes considerable inconvenience to users, so that it becomes impossible for a plurality of users to share a plurality of multimedia messages.

SUMMARY OF THE INVENTION

Accordingly, the present invention has been made to solve the above-mentioned problems occurring in the prior art, and an object of the present invention is to provide a multimedia message service method and system which enables mobile terminals to share a plurality of multimedia messages.

Another object of the present invention is to provide a multimedia message service method and system which enables a plurality of users to conveniently share multimedia messages.

Still another object of the present invention is to provide a multimedia message service method and system which enables mobile terminals to share multimedia messages stored in a multimedia message box.

To accomplish this object, in accordance with one aspect of the present invention, there is provided a method of sharing multimedia contents, by a server, comprising storing the multimedia contents, receiving an establishment request configured to establish one of a plurality of access modes for the multimedia contents from a first terminal, establishing an access mode according to the establishment request for the multimedia contents, receiving an access request for the multimedia contents stored in the server from at least one second terminal, determining whether the at least one second terminal is allowed to access the multimedia message based on the access mode, and transmitting the multimedia contents, wherein the access mode includes at least one of a private mode for access by only the first terminal, a restricted mode for access by the at least one second terminal, and a public mode for access by all terminals.

In accordance with another aspect of the present invention, there is provided a server for sharing multimedia contents, comprising a transceiver configured to receive an establishment request configured to establish one of a plurality of access modes for the multimedia contents from a first terminal, receive an access request for the multimedia contents stored in the server from at least one second terminal, and transmit the multimedia contents, and a processor configured to establish an access mode according to the establishment request for the multimedia contents and determine whether the at least one second terminal is allowed to access the multimedia message based on the access mode, wherein the access mode includes at least one of a private mode for access by only the first terminal, a restricted mode for access by the at least one second terminal, and a public mode for access by all terminals.

In accordance with another aspect of the present invention, there is provided a method for sharing multimedia contents, by a terminal, comprising generating an establishment request for establishing one of a plurality of access modes for the multimedia contents, transmitting the establishment request to a server, so that the server can establish an access mode according to the establishment request for the multimedia contents, and receiving a response to the establishment request from the server, the response including the access mode established by the server, wherein the access mode includes of least one of a private mode for access by only the terminal, a restricted mode for access by at least one receiving terminal, and a public mode for access by all terminals.

In accordance with another aspect of the present invention, there is provided a terminal for receiving multimedia contents, comprising a controller configured to generate an establishment request for establishing one of a plurality of access modes for the multimedia contents, and a transceiver configured to transmit the establishment request to a server so that the server can establish an access mode according to the establishment request for the multimedia contents, and receive a response to the establishment request from the server, the response including the access mode established by the server, wherein the access mode includes at least one of a private mode for access by only the terminal, a restricted mode for access by at least one receiving terminal, and a public mode for access by all terminals.

In accordance with another aspect of the present invention, there is provided a method for sharing multimedia contents, by a terminal, comprising receiving, from a server, a notification that the terminal is allowed to access the multimedia contents, generating an access request for the multimedia contents based on a response to the notification and transmitting the access request to the server, and receiving the multimedia contents from the server based on an access mode requested by a transmitting terminal and established or changed by the server, wherein the access mode includes at least one of a private mode for access by only the transmitting terminal, a restricted mode for access by at least one receiving terminal, and a public mode for access by all terminals.

In accordance with another aspect of the present invention, there is provided a terminal for sharing multimedia contents, comprising a transceiver configured to receive a notification from a server that the terminal is allowed to access the multimedia contents, and receive the multimedia contents from the server based on an access mode requested by a transmitting terminal and established or changed by the server, and a controller configured to generate an access request for the multimedia contents based on a response to the notification, and control to transmit the access request to the server, wherein the access mode includes at least one of a private mode for access by only the transmitting terminal, a restricted mode for access by at least one receiving terminal, and a public mode for access by all terminals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the embodiments of the present invention, a detailed description of known functions and configurations incorporated herein will be omitted when it may obscure the subject matter of the present invention.

Figure 1:
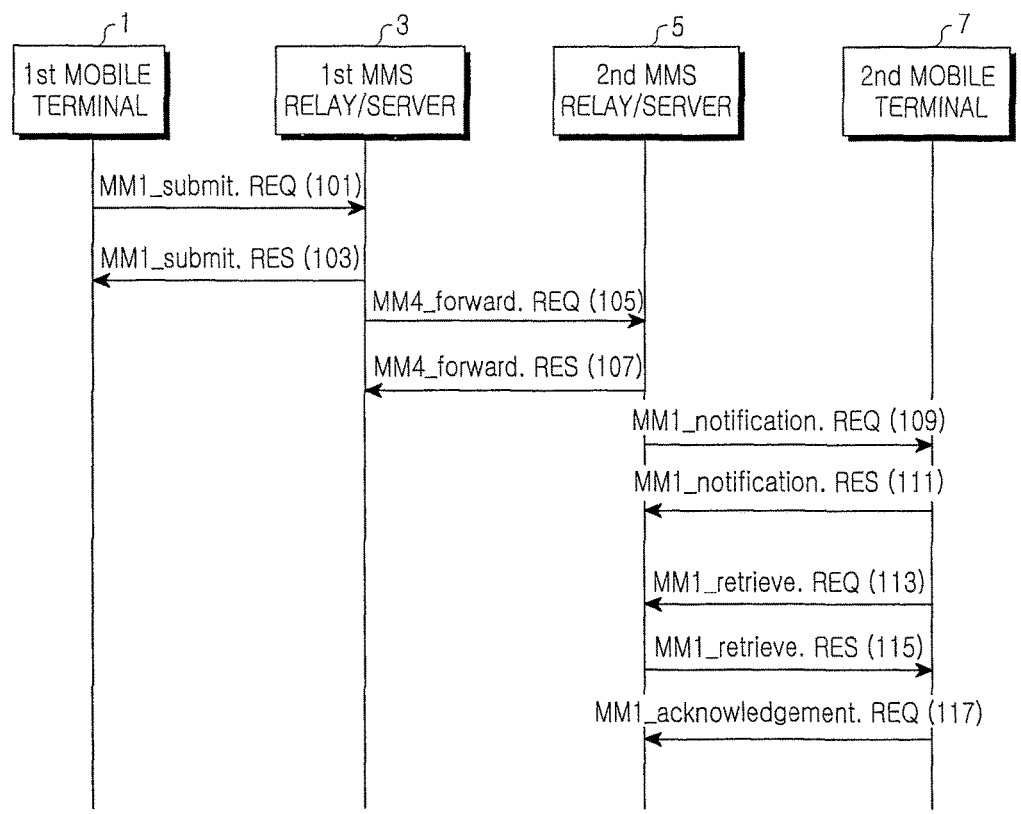
FIG. 1 is a view illustrating the flow of messages based on the conventional multimedia message service.
Figure 2:
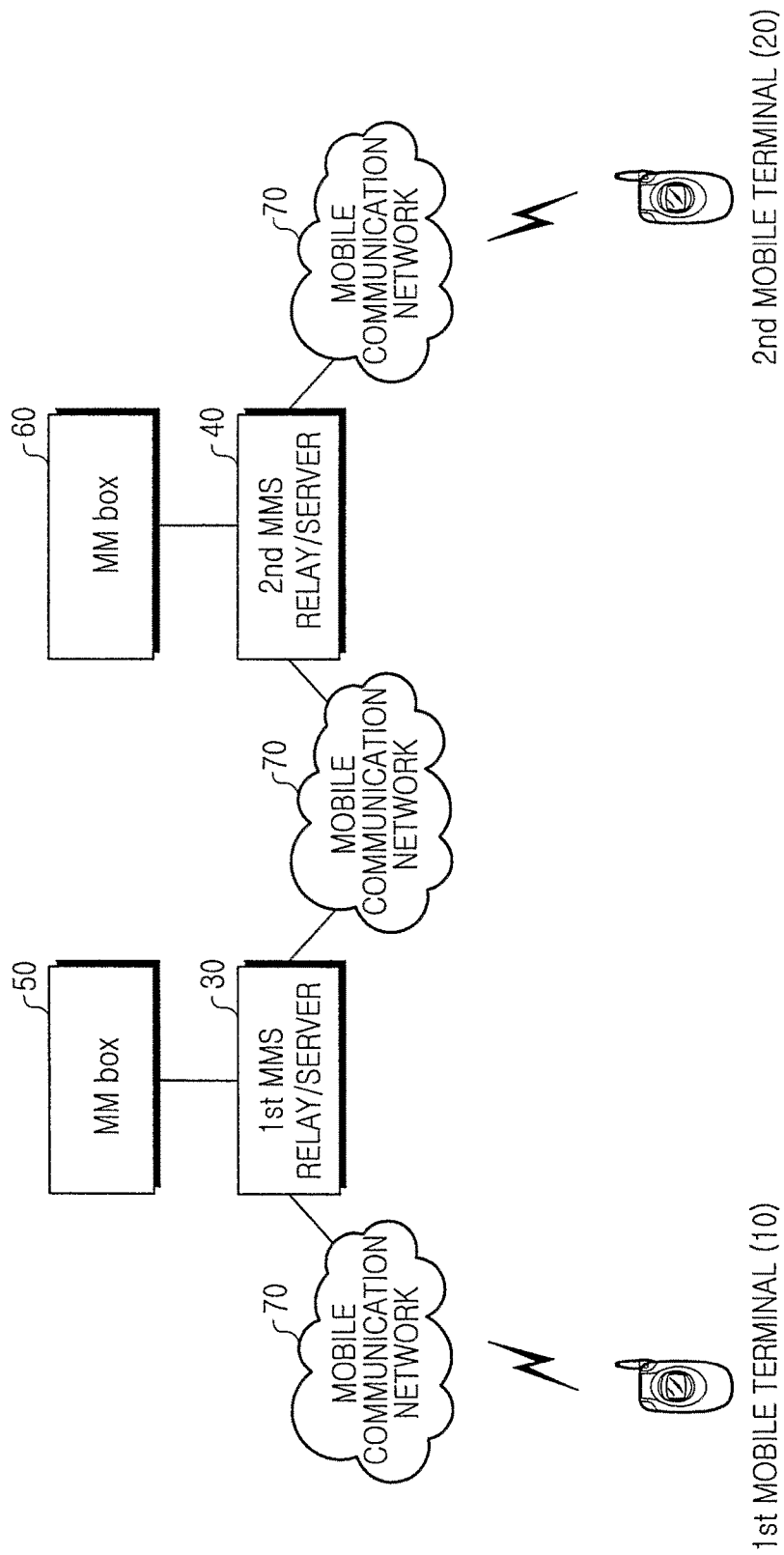
FIG. 2 is a block diagram illustrating the construction of an MMS system, to which the present invention is applied.

The construction of a multimedia message service (MMS) system, to which the present invention is applied, will now be described with reference to FIG. 2. FIG. 2 is a block diagram illustrating the construction of an MMS system, to which the present invention is applied. The MMS system includes a plurality of mobile terminals 10 and 20, a mobile communication network 70, a plurality of MMS relay/servers 30 and 40, and a plurality of multimedia message boxes (MM boxes) 50 and 60.

The mobile terminals 10 and 20 communicate with each other wirelessly through the mobile communication network 70, transmit multimedia messages as requested by the users, and perform operations referring to management of multimedia messages stored in the MM boxes 50 and 60 according to the request of the users based on the present invention. According to an embodiment of the present invention, the mobile terminals 10 and 20 include a first mobile terminal (first terminal) 10 and a second mobile terminal (second terminal) 20. Herein, the first terminal 10 stores a predetermined multimedia message in an MM box, establishes access permission for the stored multimedia message, and transmits an access permission notification to mobile terminals which have been granted access to the stored multimedia message. The second terminal 20 is a terminal which has been granted access to the stored multimedia message, receives the access permission notification, retrieves the stored multimedia message, and extracts and downloads the stored multimedia message.

The MMS relay/servers 30 and 40 are connected with the terminals 10 and 20 through the mobile communication network 70, and also the MMS relay/servers 30 and 40 are connected with each other through the mobile communication network 70. The MMS relay/servers 30 and 40 are system elements which execute the multimedia message service according to the requests of the users, and also are central elements of an MMS network. That is, the MMS relay/servers 30 and 40 cooperate not only with other MMS relay/servers but also with other messaging systems such as email, and also provide message storage services. The message storage services may be provided by the MMS relay/servers themselves, or may be provided by MM boxes which is described later in this document. Each MMS relay/server 30 or 40 may be separated into two components, that is, an MMS proxy-relay for the interaction between the terminals 10 and 20 and other messaging systems, and an MMS server for the storage services. The MMS relay/servers 30 and 40 include a first MMS relay/server 30 and a second MMS relay/server 40. The first MMS relay/server 30 is connected with the first terminal 10 through the mobile communication network 70, and the second MMS relay/server 40 is connected with the second terminal 20 through the mobile communication network 70. In this document, when a mobile terminal is connected with an MMS relay/server through the mobile communication network 70, this means that the mobile terminal is located within the service area of the MMS relay/server.

The MM boxes 50 and 60 represent storage devices associated with the MMS relay/servers 30 and 40, respectively, and are used for persistent and network-based storage of a message. The terminals 10 and 20 can interact with the MMS relay/servers 30 and 40 to manage messages stored in the MM boxes 50 and 60. The MM boxes 50 and 60 include a first MM box 50 and a second MM box 60, in which the first MM box 50 is connected with the first MMS relay/server 30 and the second MM box 60 is connected with the second MMS relay/server 40.

According to the multimedia message system as described above, a mobile terminal transmits a predetermined multimedia message to an MMS relay/server so that the predetermined multimedia message is stored in an MM box. In addition, the mobile terminal establishes access permission conditions of the multimedia message stored in the MM box so that other mobile terminals can access the multimedia message, and transmits an access permission notification to other mobile terminals which have been granted access to the stored multimedia message. Also, mobile terminals can access multimedia messages (access-permitted multimedia messages), to which access has been permitted, and can search and access multimedia messages of other users which are stored in the MM boxes.

Accordingly, the MMS relay/server stores a predetermined multimedia message in an MM box as requested by the user, and establishes or changes an access permission condition of the stored multimedia message depending on a user's request for establishment of access permission. The MMS relay/server transmits an access permission notification to a corresponding terminal depending on an access permission notification request or access permission condition change request. Also, when receiving a multimedia message retrieval request from a mobile terminal, the MMS relay/server compares the access right of the mobile terminal requesting the retrieval with the access permission conditions of predetermined multimedia messages, retrieves multimedia messages which can be provided, and transmits the retrieved multimedia messages to the mobile terminal requesting the retrieval.

Figure 3:
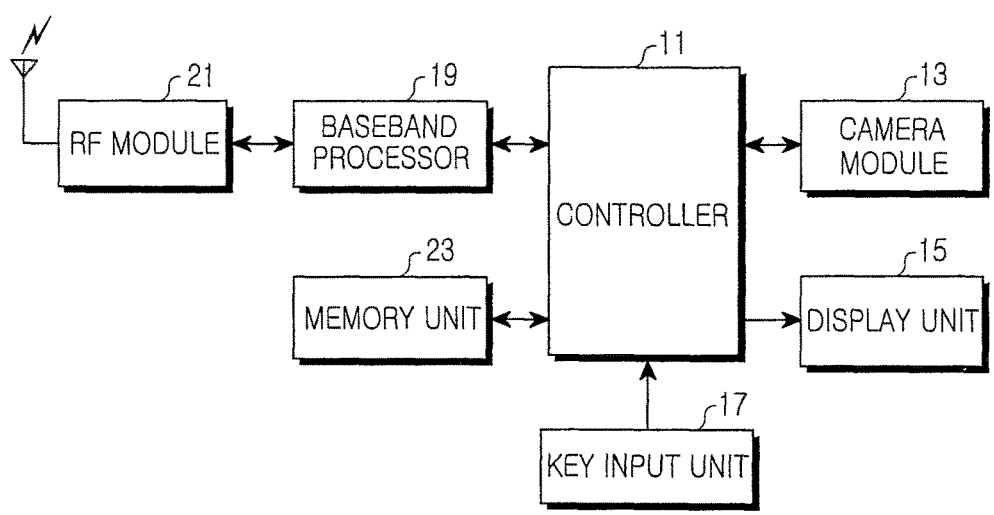
FIG. 3 is a block diagram illustrating the construction of a mobile terminal, to which the present invention is applied.

Hereinafter, the operation of the MMS system according to the present invention will be described in detail with reference to FIGS. 3 to 15. First, the construction of a mobile terminal, to which the present invention is applied, will be described with reference to FIG. 3. FIG. 3 is a block diagram illustrating the construction of a mobile terminal, to which the present invention is applied.

The mobile terminal includes a controller 11, a camera module 13, a display unit 15, a key input unit 17, a baseband processor 19, an RF (Radio Frequency) module 21, and a memory unit 23.

The camera module 13 outputs image frames obtained by an image sensor.

The display unit 15 displays various image information and data information either received from a base station or stored in the memory unit 23 on a screen according to the control of the controller 11.

The key input unit 17 includes numeric keys of 0 to 9, symbol keys of '*' and '#', direction keys, and a plurality of function keys of 'menu', 'select', 'send', 'delete', 'power on/off', 'volume', etc., which correspond to multiple functions of the mobile terminal. The key input unit 17 provides key input data corresponding to a key pressed by the user to the controller 11.

The RF module 21 transmits/receives wireless signals to/from a base station through an antenna. In detail, the RF module 21 modulates a transmission signal input through the baseband processor 19 from the controller 11 so as to transmit an RF signal through an antenna, and demodulates an RF signal received through an antenna so as to provide the demodulated signal to the controller 11 through the baseband processor 19. The baseband processor 19 processes baseband signals transferred between the RF module 21 and the controller 11.

The memory unit 23 stores a program for the processing and control operations of the controller 11, reference data, various maintenance data which can be updated, various multimedia data, etc., and provides the stored program and data to a working memory of the controller 11. The multimedia data represent contents which are inserted into and transmitted with a multimedia message upon an MMS. Such multimedia data include, for example, sound source data, moving picture data, image data, and text data.

The memory unit 23 stores program data required for the execution of the MMS, and stores program data referring to a multimedia message access management menu according to an embodiment of the present invention. The multimedia message access management menu is used for establishing access permission so as to share multimedia messages stored in an MM box with other mobile terminals, and includes an access permission establishment and change menu, an access permission condition information providing menu, an access permission notifying menu, and a multimedia message retrieval menu, in relation to the multimedia messages.

The access permission establishment and change menu is used for permitting access to multimedia messages stored in an MM box and for changing an access permission condition of the multimedia messages. The access permission establishment or change is achieved by establishing access permission conditions for a multimedia message, or changing the previously-established access permission conditions. The access permission conditions include an access mode, access user information, an access deadline, and an access display list.

The access mode represents an access permission level associated with a multimedia message. According to an embodiment of the present invention, the access mode includes three modes, that is, a private mode, a restricted mode, and a public mode. The private mode means that only the owner of the multimedia message can access the multimedia message. The restricted mode means that only a restricted list of users specified by the owner are granted access to the predetermined multimedia message. The public mode means that all users are granted access to the predetermined multimedia message. When an access permission condition is established, if no access mode is specified, any one of the three modes may be the default value.

The access user information represents a list of users who can access a predetermined multimedia message, of which the access mode has been established as the restricted mode.

The access deadline represents the expiration time of the access to a corresponding message when the access mode of the corresponding multimedia message has been established as the restricted mode or public mode.

The access display list includes information about access permission conditions which can be provided to mobile terminals granted access to a multimedia message, and may include access mode information, access user information, and access deadline information. For instance, when the access display list includes access mode information, the user of a mobile terminal accessing a predetermined multimedia message can see its own access level. Also, when the access display list includes access user information, the user of a mobile terminal accessing a predetermined multimedia message can know the users of other mobile terminals who can access the multimedia message. However, access permission condition information, which is not included in the access display list, is not provided to a mobile terminal accessing a predetermined multimedia message. If the access display list is not specified, a default list should be applied for a predetermined multimedia message. The default list is defined by the service provider. If no default list exists, no access permission condition may be provided.

Upon establishment of the access permission conditions as described above, when the access mode to be established is the private mode, the access user information and access deadline does not need to be specified. It is preferred that the access user information is specified when the access mode is established as the restricted mode. Also, it is preferred that the access deadline is specified when the access mode is established as the restricted mode or public mode, and the access display list may be specified in any request independently.

The access permission condition information providing menu is used for requesting information about access permission conditions, which are established for multimedia messages belonging to the user of a mobile terminal, to an MMS relay/server.

The access permission notifying menu is used for requesting to notify a mobile terminal granted access to a multimedia message that the access has been granted. Using the access permission notifying menu, the user may establish an access notification or shared-multimedia notification in an access permission notification request message, and may establish an access notification list. The access notification list represents a list of access permission conditions provided to an access-permitted mobile terminal upon a multimedia message access permission notification.

The multimedia message retrieval menu is used for retrieving multimedia messages stored in an MM box.

The controller 11 controls the entire operation of the mobile terminal, such as voice communication, data communication, and additional functions thereof. According to an embodiment of the present invention, when transmitting the multimedia message to an MMS relay/server, the controller 11 transmits a message including a multimedia message and appropriate information according to a menu item selected by the user.

Figure 4:
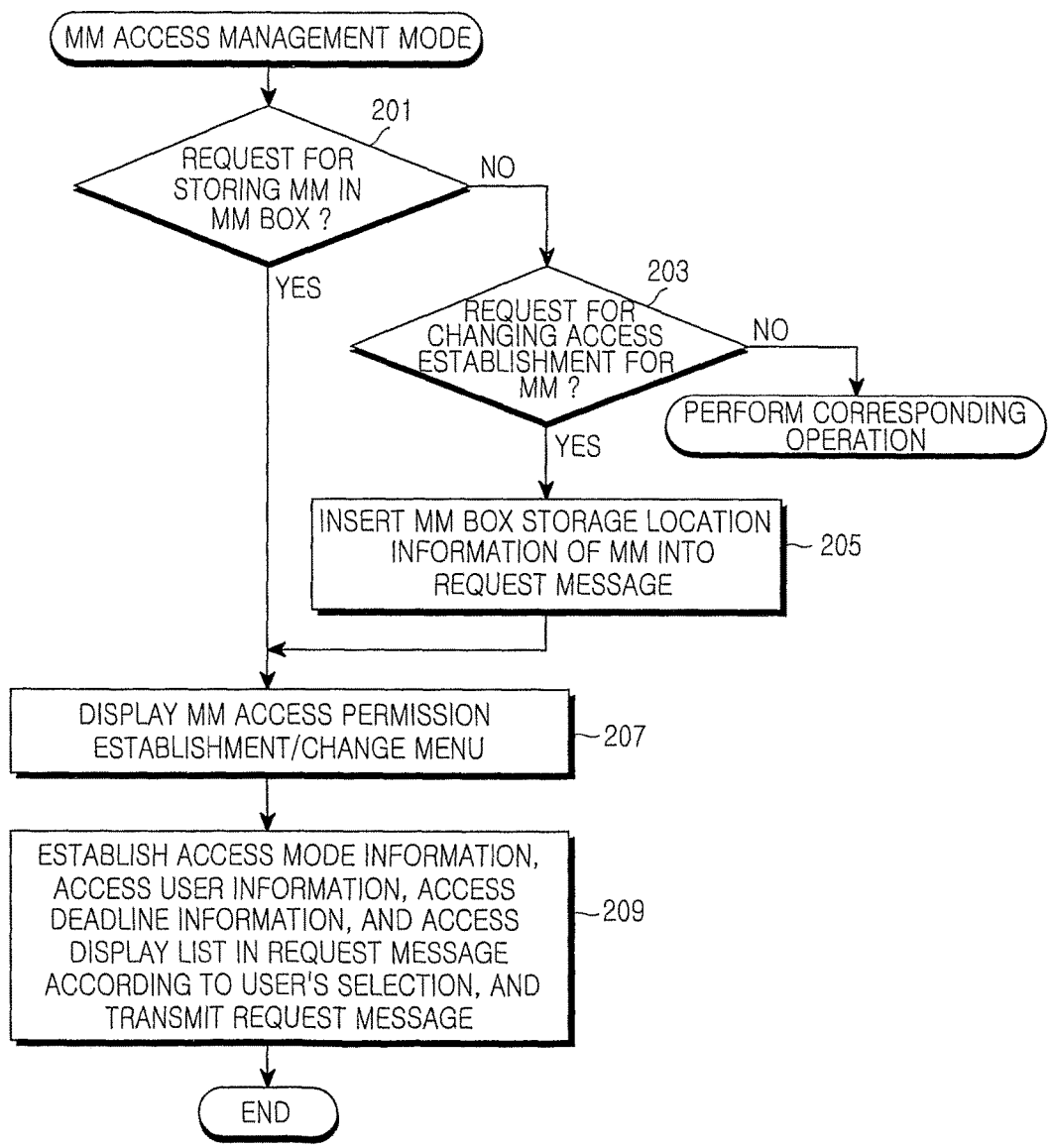
FIG. 4 is a flowchart illustrating the operation of a mobile terminal based on a procedure of establishing access permission conditions according to an embodiment of the present invention.

A procedure of establishing/changing, by the mobile terminal, access permission conditions for a multimedia messages stored in an MM box will be described according to an embodiment of the present invention with reference to FIG. 4. FIG. 4 is a flowchart illustrating the operation of a mobile terminal based on a procedure of establishing access permission conditions according to an embodiment of the present invention. Under a multimedia message access management mode, when receiving a request for storing a predetermined multimedia message in an MM box in step 201, the controller 11 of the mobile terminal proceeds to step 207, but if it is not receiving such a request, the controller 11 proceeds to step 203. Upon forwarding or storing the predetermined multimedia message in the MM box, temporary address information of the MMS relay/server may be included in or attached to the predetermined multimedia message. In step 203, when receiving an access permission establishment change request for the predetermined multimedia message, the controller 11 proceeds to step 205, but it is not receiving such a request, the controller 11 performs a corresponding operation. In step 205, the controller 11 creates a request message by inserting the MM box storage location information of the predetermined multimedia message into the request message, and proceeds to step 207. In step 207, the controller 11 displays a multimedia message access permission establishment/change menu, and proceeds to step 209. In step 209, the controller 11 establishes access mode information, access user information, access deadline information, and an access display list in the request message based on the selection of the user, transmits the request message, and ends the procedure.

In this case, the controller 11 must insert sender information, that is, the telephone number of the mobile terminal or information representing the location of the sender, into the request message. This is because such information represents that the predetermined multimedia message belongs to the user of the mobile terminal.

Figure 6:
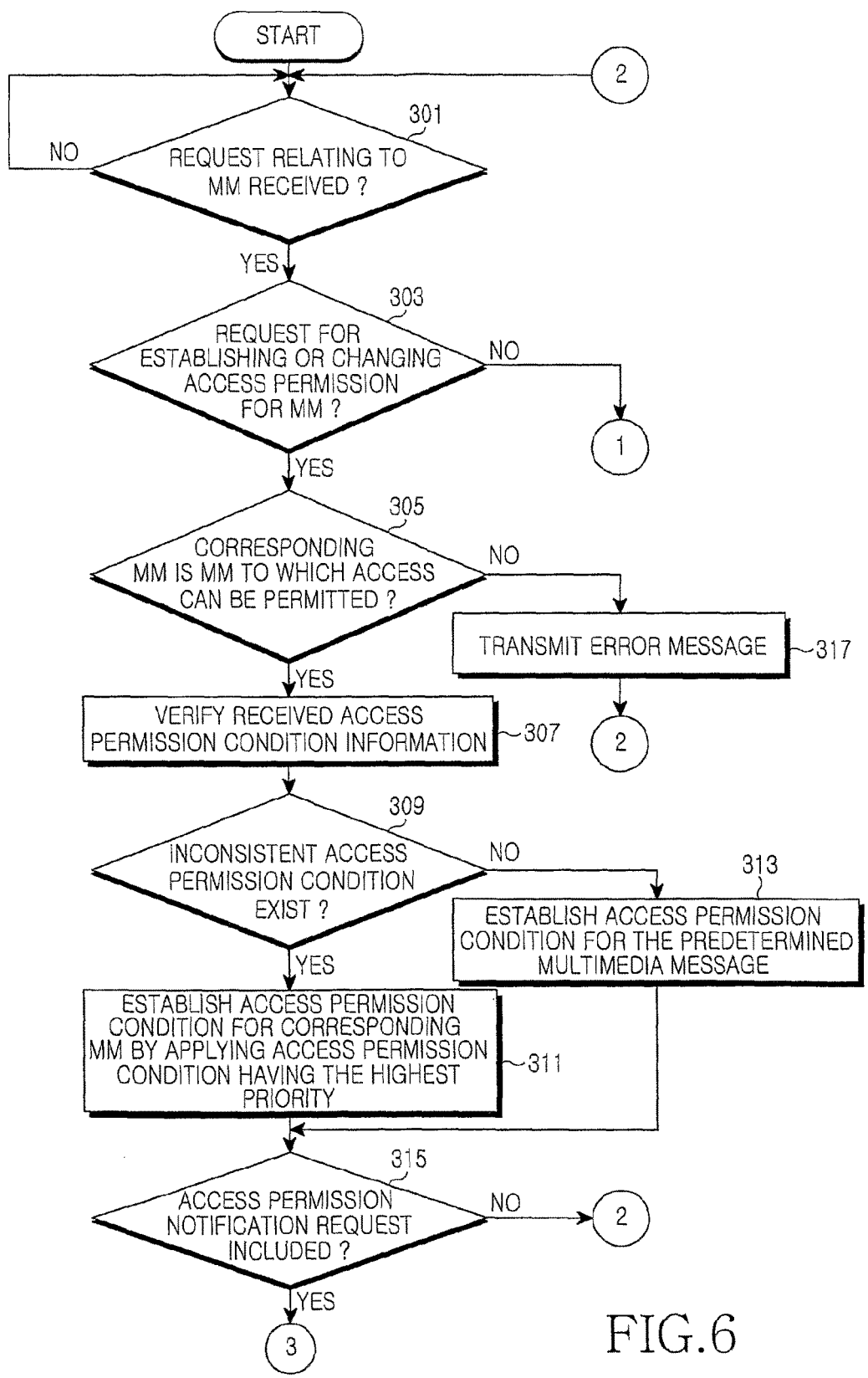
FIG. 6 is a flowchart illustrating the operation of an MMS relay/server based on a procedure of establishing access permission conditions according to an embodiment of the present invention.

The operation of the MMS relay/server, which has received the request message, is shown in FIG. 6. FIG. 6 is a flowchart illustrating the operation of the MMS relay/server based on a procedure of establishing access permission conditions according to an embodiment of the present invention. Herein, it is possible to establish access permission for a multimedia message, to which access permission has been not established, or to change access permission previously-established for a multimedia message. Referring to FIG. 6, when receiving a request relating to a predetermined multimedia message in step 301, the MMS relay/server proceeds to step 303. In step 303, the MMS relay/server determines if the received request is an access permission establishment or change request for the predetermined multimedia message. When it is determined in step 303 that the received request is an access permission establishment or change request for the predetermined multimedia message, the MMS relay/server proceeds to step 305. In contrast, when it is determined in step 303 that the received request is not an access permission establishment or change request for the predetermined multimedia message, the MMS relay/server goes to number ① to perform step 319 of FIG. 7. In step 305, the MMS relay/server determines if the predetermined multimedia message is a multimedia message (an access-permitted multimedia message) to which access is able to be permitted. When it is determined in step 305 that the predetermined multimedia message is a multimedia message to which access is able to be permitted, the MMS relay/server proceeds to step 307. In contrast, when it is determined in step 305 that the predetermined multimedia message is a multimedia message to which access is unable to be permitted, the MMS relay/server proceeds to step 317. In step 317, the MMS relay/server transmits an error message and goes to number ② to return to step 301.

In this case, in order to determine if the predetermined multimedia message is a multimedia message to which access is able to be permitted, the MMS relay/server checks the following criteria. First, the MMS relay/server checks if the predetermined multimedia message is a valid multimedia message which is either already stored in an MM box or requested to be stored in an MM box. If the predetermined multimedia message is a multimedia message temporarily stored in the MMS relay/server, no access permission can be established. In relation to the first criterion, the MMS relay/server may notify a corresponding mobile terminal that the predetermined multimedia message is an already-stored multimedia message, or may perform an overwriting operation. Second, when the predetermined multimedia message is a multimedia message already stored in the MMS relay/server, the MMS relay/server checks if the user requesting the access permission establishment or change is the owner of the predetermined multimedia message. This check can be achieved using sender information of the mobile terminal originating the request. Third, the MMS relay/server checks if the predetermined multimedia message corresponds to a multimedia message which must not be shared with a plurality of users. For example, there is a multimedia message protected with forward-lock type digital rights management (DRM).

Referring again to FIG. 6, in step 307, the MMS relay/server checks received access permission condition information and proceeds to step 309. In step 309, the MMS relay/server checks if the received access permission condition information includes inconsistent access permission conditions. Then, the MMS relay/server proceeds to step 311 if there are inconsistent access permission conditions, but proceeds to step 313 if there is no inconsistent access permission condition. Herein, the "inconsistent access permission conditions", for example, represent a case in which access user information is established while the access mode is established as a restricted mode. In step 311, since there are inconsistent access permission conditions in the received access permission condition information, the MMS relay/server establishes access permission conditions for the predetermined multimedia message by applying an access permission condition having the highest priority, and then proceeds to step 315. Herein, the most constraining access permission condition means an access permission condition which allows only the minimum number of users to share a predetermined multimedia message or access permission condition information established therefor. For example, the restricted mode has a more constraining access permission condition than the public mode. In step 313, since there is no inconsistent access permission condition in the received access permission condition information, the MMS relay/server establishes access permission conditions for the predetermined multimedia message, and proceeds to step 315. In other words, the MMS relay/server establishes access permission conditions for the predetermined multimedia message stored in the MM box based on access permission conditions included in the access permission establishment or change request. In this case, the MMS relay/server establishes access permission conditions for the predetermined multimedia message, by giving a priority to the most constraining access permission condition from among access permission conditions included in the access permission establishment or change request. In step 315, the MMS relay/server checks if an access permission notification request is included in the access permission establishment or change request. The MMS relay/server goes to number ③ to proceeds to step 329 of FIG. 9 if an access permission notification request is included in the access permission establishment or change request message, but the MMS relay/server goes to number ② to return to step 301 if an access permission notification request is not included in the access permission establishment or change request message. This is because the access permission establishment or change request message may include an access permission notification request.

Figure 5:
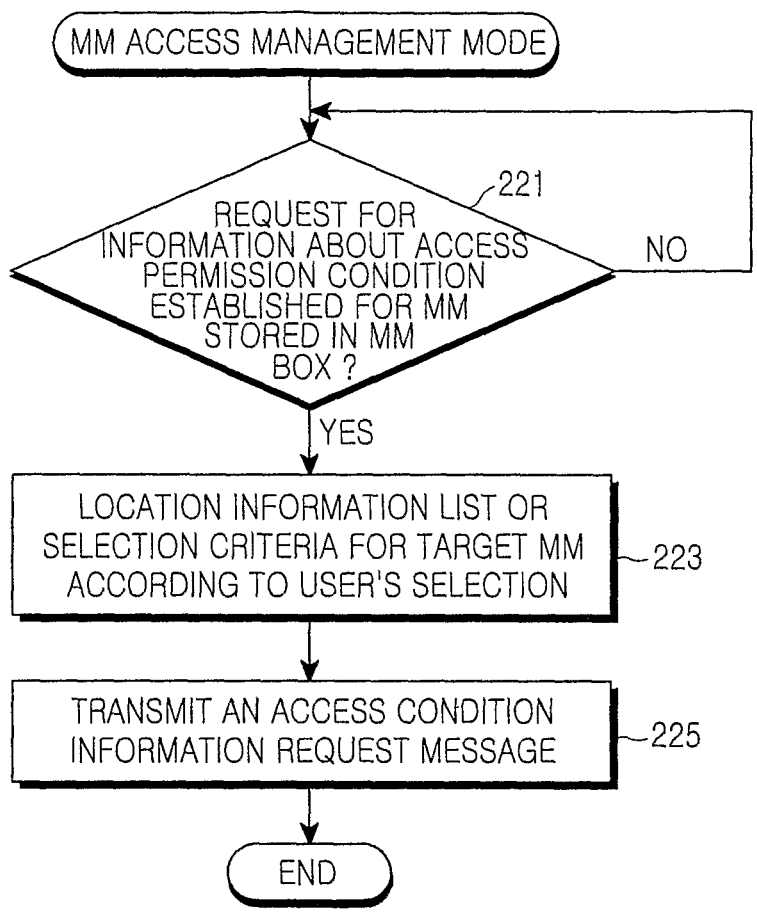
FIG. 5 is a flowchart illustrating the operation of a mobile terminal based on a procedure of requesting access permission condition information according to an embodiment of the present invention.

Hereinafter, a procedure of requesting, by the mobile terminal, an access permission condition established for a predetermined multimedia message will be described with reference to FIG. 5. FIG. 5 is a flowchart illustrating the operation of the mobile terminal based on a procedure of requesting access permission condition information according to an embodiment of the present invention. When an information provision in relation to access permission conditions established for a predetermined multimedia message stored in an MM box is requested by the user in step 221, the controller 11 of the mobile terminal proceeds to step 223. In step 223, the controller 11 establishes a location information list or selection criteria for target multimedia messages based on the selection of the user, and proceeds to step 225. In step 225, the controller 11 transmits an access condition information provision request message to the MMS relay/server, and ends the procedure. The "selection criteria for target multimedia messages" may include a specified access mode, a specified access deadline, and/or specified user information. For example, when the selection criteria are established as the restricted mode, only multimedia messages, the access mode of which is established as the restricted mode, become retrieval targets.

Figure 7:
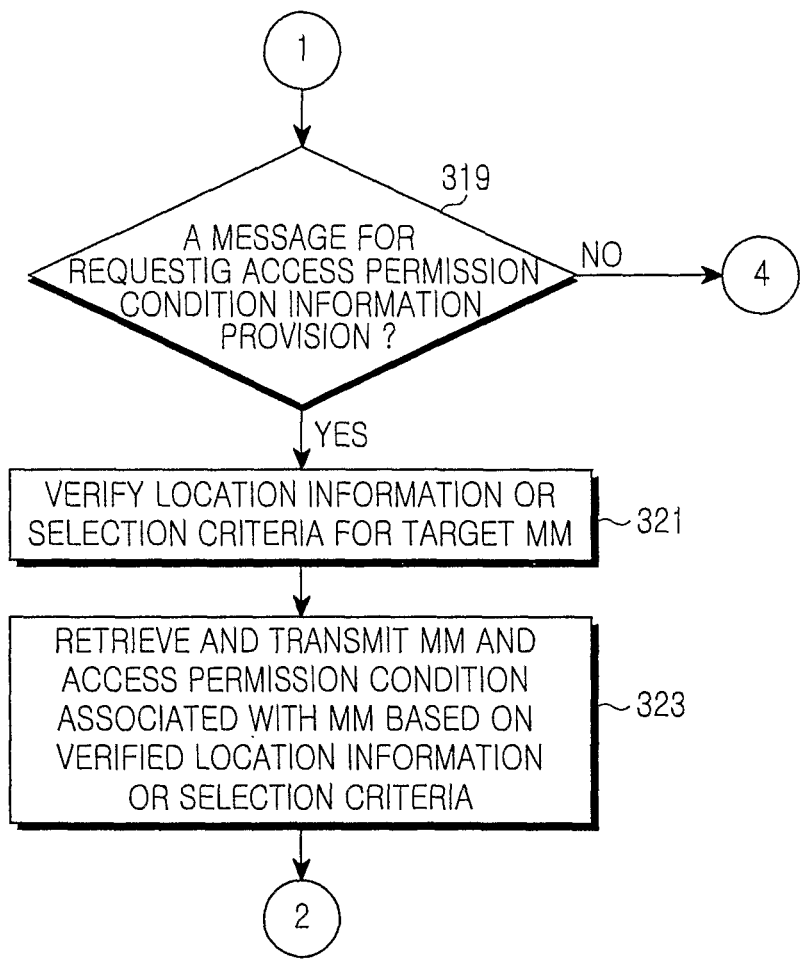
FIG. 7 is a flowchart illustrating the operation of an MMS relay/server based on a procedure of providing access permission condition information according to an embodiment of the present invention.

The operation of the MMS relay/server, which has received the access condition information provision request message, is shown in FIG. 7. FIG. 7 is a flowchart illustrating the operation of the MMS relay/server based on a procedure of providing access permission condition information according to an embodiment of the present invention. Referring to FIGS. 6 and 7, when the MMS relay/server receives a request relating to a multimedia message in step 301 of FIG. 6, the MMS relay/server checks the type of the received request relating to the multimedia message, and proceeds to step 319 of FIG. 7. In step 319, the MMS relay/server determines if the received request corresponds to an access permission condition information provision request. If the received request corresponds to an access permission condition information provision request, the MMS relay/server proceeds to step 321, but the received request does not correspond to an access permission condition information provision request, the MMS relay/server goes to number ④ to proceed to step 325 of FIG. 9. In step 321, the MMS relay/server checks location information or selection criteria for the target multimedia message, and proceeds to step 323. In step 323, the MMS relay/server retrieves a predetermined multimedia message to be provided and access permission conditions established for the predetermined multimedia message, transmits the retrieved message and conditions thereof to the mobile terminal, and goes to number ② to return to step 301 of FIG. 6.

Hereinafter, the transaction according to the present invention, which is established between the mobile terminal and the MMS relay/server in order to perform the operation in cooperation with the request for an access permission establishment/change or access permission condition information provision for a multimedia message will now be described.

The first method employs new dedicated transaction, instead of the conventional MMS transaction. That is, MM1_mmbox_set_access messages are added for a transaction to establish or change access permission for a multimedia message, and MM1_mmbox_get_access messages are added for a transaction to be provided with access permission conditions for one or more multimedia messages.

That is, a mobile terminal requesting an access permission establishment or change uses the MM1_mmbox_set_access.REQ message as an access permission establishment/change request message. Therefore, the header of the MM1_mmbox_set_access.REQ message includes access permission condition information, which contains a sender address, location information of a predetermined multimedia message in an MM box, access mode information, access user information, access deadline information, an access display list, etc. The MMS relay/server having received the MM1_mmbox_set_access.REQ message performs the procedure shown in FIG. 6, thereby transmitting an MM1_mmbox_set_access.RES message to the mobile terminal so as to notify the mobile terminal that the access permission establishment or change request is successfully completed, or transmitting an error message if an error occurs.

When requesting an access permission condition provision, the mobile terminal uses an MM1_mmbox_get_access.REQ message as an access permission condition provision request message. Therefore, the header of the MM1_mmbox_get_access.REQ message must include a location information list of target multimedia messages. The MMS relay/server having received the MM1_mmbox_get_access.REQ message performs the procedure shown in FIG. 7. Herein, the MMS relay/server inserts the location information of multimedia messages and the access permission condition information thereof, having been obtained as a result of retrieval, into the header or body of the MM1_mmbox_get_access.RES message, and transmits the MM1_mmbox_get_access.RES message to the mobile terminal. In this case, if the request cannot be satisfied, for example, if a message is not found, the MMS relay/server must provide the MM1_mmbox_get_access.RES message including the status of an error.

The second transaction according to the present invention, which is established between the mobile terminal and the MMS relay/server in order to perform the operation in cooperation with the request for an access permission establishment/change or an access permission condition for a multimedia message, employs the conventional transaction used for the multimedia message service. According to an embodiment of the present invention, the transaction may include the request for performing the operation of the present invention while the operation involved in the conventional transaction is being performed. For example, the access permission condition can be established while the multimedia message is being uploaded to the MM box.

First, the transaction used for establishing access permission for a multimedia message may use an MM1_mmbox_upload.REQ message, an MM1_mmbox_store.REQ message, an MM1_submit.REQ message, or an MM1_forward.REQ message. The transaction for changing access permission established for a multimedia message may use the MM1_mmbox_store.REQ message, and the transaction for viewing access permission attributes for one or more multimedia messages may use an MM1_mmbox_view.REQ message.

The MM1_mmbox_upload.REQ message is used for the mobile terminal to request establishment of access permission for a multimedia message while uploading the multimedia message to the MM box, and the MM1_mmbox_store.REQ message is used for mobile terminal to request access permission establishment for a multimedia message while moving and storing the multimedia Message from a temporary storage of the MMS relay/server to the MM box. The MM1_submit.REQ message can be used while a multimedia message to be forwarded is being submitted, and the MM1_forward.REQ message can be used while the multimedia message is being forwarded in order to request that the multimedia message must be stored in the MM box and to request an access permission establishment for the multimedia message. In this case, the header of each message must contain access permission condition information for each predetermined multimedia message, and the MM1_mmbox_store.REQ message must additionally include location information of a multimedia message, for which access permission is to be established.

In order to change access permission attributes of a multimedia message stored in the MM box, the MM1_mmbox_store.REQ message is used. When the mobile terminal requests an access permission change by using the MM1_mmbox_store.REQ message, the MM1_mmbox_store.REQ message must include access permission condition information, which contains a sender address of the MM1_mmbox_store.REQ message, location information of a corresponding multimedia message in the MM box, access mode information, access user information, access deadline information, an access display list, etc. Herein, the location information must indicate a multimedia message already stored in the MM box. This notifies the MMS relay/server that the requested action is not to store a new multimedia message in the MM box, but is to change the attributes of a multimedia message already stored in the MM box.

When the mobile terminal requests provision of access permission conditions established for a multimedia message already stored in the MM box, an MM1_mmbox_view.REQ message is used. Information included in the MM1_mmbox_view.REQ message is shown in Table 1. Table 1 shows information included in the header of the MM1_mmbox_view.REQ message.

TABLE 1

| Information element | Presence | Description |
| --- | --- | --- |
| Attribute List | Optional | A list of information elements that are to be returned as a group for each MM to be listed in the MM1_mmbox_view.RES. If absent, the default list shall apply. |
| Location Information List | Optional | Location information of MMs to be retrieved. |
| Select | Optional | A list of MM State or MM Flag keywords, by which MMs within the MM box can be selected, if the Message Reference list is absent. |
| Start | Optional | A number, indicating the index of the first MM of MMs returned in the response. If this is absent, the first item selected is returned. |
| Limit | Optional | A number indicating the maximum number of MMs returned in the response. If this is absent, information elements from all remaining MMs are returned. |
| Selection Criteria | Optional | Selection Criteria for MMs to be retrieved. One or more criteria included in access permission conditions are used. |

The MM1_mmbox_view.REQ message is very flexible and can be used to get any information about a multimedia message. The information shown in Table 1 is used as criteria for selecting multimedia messages to be retrieved according to an access permission information provision request, and is used as criteria for selecting access permission condition information to be provided to the mobile terminal, from among access permission conditions established for each selected multimedia message.

The location information list shown in Table 1 represents the locations of multimedia messages in the MM box, so that the mobile terminal can request the provision of access permission condition information about specific multimedia messages by using the location information list.

The titles (not values) of access permission condition information desired to be actually provided, from among access permission condition information about target multimedia messages, must be included in the attribute list shown in Table 1. For example, if an attribute list is established to include access mode information, access user information, access deadline information, and an access display list, all access permission condition information established for each multimedia message to be provided is provided to the mobile terminal. In this case, the access display list referring to a multimedia message is provided only to the owner of the multimedia message.

The selection criteria are used for establishing access permission condition information as selection criteria for multimedia messages to be retrieved, in which one or more access permission conditions are established according to the selection of the user. For example, the access mode may be established as the restricted mode. In this case, multimedia messages, whose access modes have been established as the restricted mode, are selected as retrieval targets, and the multimedia messages and access permission condition information thereabout are inserted into and transmitted with the MM1_mmbox_view.RES message. In addition, if the selection criteria include "access user=<address of a predetermined mobile terminal>", "access deadline=00:00:00, May 31, 2005", and "access display list=access mode and access deadline", multimedia messages, to which access of the predetermined mobile terminal is granted, an access deadline of which ends before May 31, 2005, or an access display list of which contains the "access mode" and "access deadline", are retrieved and information of access permission condition related to the multimedia messages is transmitted to the mobile terminal. When the "location information list" is specified, no other selection criterion must be specified.

Finally, information satisfying the criteria shown in Table 1 is included in the MM1_mmbox_view.RES message. For example, if the selection criteria are established as a public mode and the attribute list includes the access deadline, only multimedia messages whose access mode has been established as a public mode are selected, and access deadline information established for the selected multimedia messages is inserted into and transmitted with an MM1_mmbox_view.RES message.

When receiving the MM1_mmbox_view.REQ message, the MMS relay/server checks if the location information list of Table 1 is specified, and if the location information list is specified, the MMS relay/server selects the multimedia messages based on the location information list and ignores the other selection criteria. Then, the MMS relay/server detects access permission condition information established for the multimedia messages, which are selected based on access permission condition information included in the attribute list of Table 1, and transmits the detected access permission condition information together with the an MM1_mmbox_view.RES message to the requesting mobile terminal by associating the detected access permission condition information with the selected multimedia messages.

When an MM1_mmbox_view.REQ message received by the MMS relay/server does not include a location information list, the MMS relay/server checks if the selection criteria of the MM1_mmbox_view.REQ message include an access mode, access user information, an access deadline, or an access display list, and selects multimedia messages corresponding to an access permission condition included in the selection criteria. Then, the MMS relay/server inserts the selected multimedia messages and access permission condition information filtered by the attribute list into an MM1_mmbox_view.RES message, and transmits the MM1_mmbox_view.RES message to the requesting mobile terminal.

Figure 8:
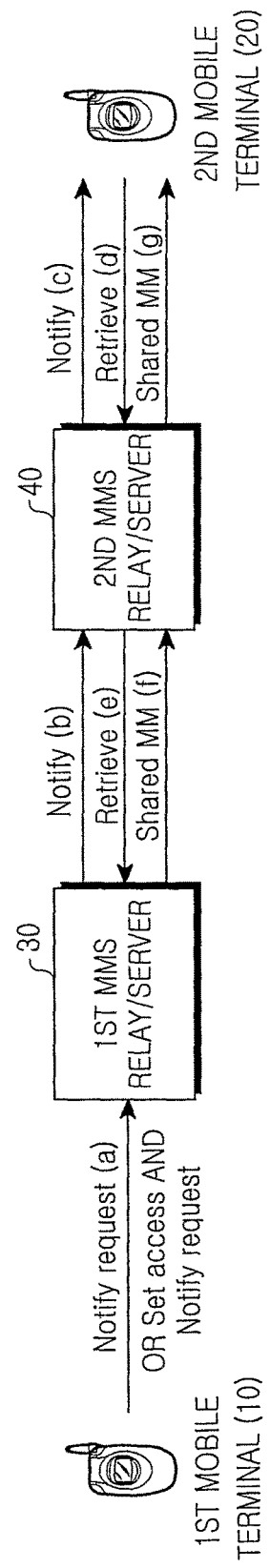
FIG. 8 is a view illustrating an access permission notification procedure according to an embodiment of the present invention.

Hereinafter, the operational procedure of the MMS system based on an access permission establishment notification will be described with reference to FIGS. 9 to 12. The access permission establishment notification is used for notifying a mobile terminal, which can be granted access to a predetermined multimedia message, that the access to the predetermined multimedia message is permitted or that the established access permission is revoked, the entire system operation for which is shown in FIG. 8. FIG. 8 is a view illustrating the operational flow of a mobile terminal based on a procedure of requesting an access permission condition information according to an embodiment of the present invention. Herein, a first mobile terminal 10 establishes access permission for a predetermined multimedia message so as to determine whether sharing the predetermined multimedia message, and a second mobile terminal 20 is a terminal granted access to the predetermined multimedia message. The first mobile terminal 10 and second mobile terminal 20 are connected to a first MMS relay/server 30 and a second MMS relay/server 40, respectively. Although MM boxes are not shown in FIG. 8, it is assumed that interfaces exist between the MMS relay/servers and corresponding MM boxes. In step "a", the first mobile terminal 10 requests the first MMS relay/server 30 to notify the second mobile terminal 20 that access to a predetermined multimedia message is permitted. Such an access permission notification request may be submitted for a multimedia message, for which access permission has been established in advance, or may be submitted together with an access permission establishment request. In step "b", the first MMS relay/server 30 transmits an access permission notification to the second MMS relay/server 40 based on the access permission notification request so that the second mobile terminal 20 can receive the access permission notification for a predetermined multimedia message. In step "c", the second MMS relay/server 40 transmits the access permission notification to the second mobile terminal 20, thereby notifying the second mobile terminal 20 that the first mobile terminal 10 has been granted access to the predetermined multimedia message of stored in an MM box, and provides the second mobile terminal 20 with location information about the predetermined multimedia message. In step "d", the second mobile terminal 20 requests the second MMS relay/server 40 to retrieve the multimedia message to which access is permitted. In step "e", the second MMS relay/server 40 transmits a multimedia message retrieval request to the first MMS relay/server 30. In step "f", the first MMS relay/server 30 verifies whether or not the originating requestor (i.e. the second mobile terminal 20) has access authority for retrieval of the predetermined multimedia message. When it is verified that the second mobile terminal 20 has the access authority, the first MMS relay/server 30 transmits a response containing the predetermined multimedia message to the second MMS relay/server 40. Otherwise, the first MMS relay/server 30 may send only a response to the access authority, and the second mobile terminal 20 or second MMS relay/server 40 may access a server having stored multimedia messages of the first mobile terminal 10 and download the predetermined multimedia message from the server. In step "g", the second MMS relay/server 40 transmits the predetermined multimedia message to the second mobile terminal 20 in response to the retrieval request. If the first mobile terminal 10 and the second mobile terminal 20 are connected to the same MMS relay/server, it is unnecessary to perform the transaction (i.e. steps "b", "e", and "f") between the MMS relay/servers.

The access permission notification procedure requires information, which contains a sender address, a recipient address, location information, an access notification, an access notification list, access permission condition information, and access-permission-related information.

In the case of establishing access permission for a predetermined multimedia message and forwarding a notification about the established access permission, the sender address represents the address of a mobile terminal which owns the predetermined multimedia message. In the case of retrieving a predetermined multimedia message, the sender address represents the address of a mobile terminal which has been granted access to the predetermined multimedia message and requests to retrieve the predetermined multimedia message.

The recipient address represents the address of a recipient-side mobile terminal to receive the access permission notification. In the case of retrieving a shared multimedia message, the recipient address represents the owner of the shared multimedia message, thereby helping to verify the address of an MMS relay/server which possesses the shared multimedia message.

The location information represents the storage location of a predetermined multimedia message in an MM box, and is used when an access-permitted mobile terminal retrieves the predetermined multimedia message or retrieves information about the predetermined multimedia message.

The access notification (or a share-permission-related value) may take one of two values of "yes" and "no". Herein, the "yes" means that access permission for a predetermined multimedia message has been established to share the predetermined multimedia message, so that a notification about this must be transmitted to a mobile terminal granted access to the predetermined multimedia message.

The access notification list represents a list of access permission conditions to be provided to an access-permitted mobile terminal upon a multimedia message access permission notification. The access notification list has the same function as the access display list, but the access notification list and the access display list have different features as follows. While the access display list is used upon requesting retrieval or view of information about a multimedia message, the access notification list is included in the contents of an access permission notification of a multimedia message so as to be provided.

When an access notification list is specified in an access permission notification request, access permission condition information specified in the access notification list must be included a corresponding access permission notification. In contrast, when no access notification list is specified in an access permission notification request, a corresponding access permission notification must include access permission condition information based on an access display list associated with a relevant multimedia message. When neither an access notification list nor an access display list is available, a default list (e.g. defined by the service provider) is used if there is the default display list. In this case, if no default display list is available, the access permission notification includes no access permission condition information.

The access-permission-related information is used to represent that an access permission notification is to authorize an access to a multimedia message or on the contrary, to revoke an access to the multimedia message. The access-permission-related information can take one of two values of "yes" and "no". Herein, the "yes" means that an access has been authorized, while the "no" means that an access has been revoked. The default value should be "yes".

When a mobile terminal requests an access permission notification for a predetermined multimedia message according to the request of the user, as described in step "a" of FIG. 8, an access permission notification request message, which includes a sender address, a recipient address, location information about a predetermined multimedia message, and an access notification list, is transmitted to an MMS relay/server.

Figure 9:
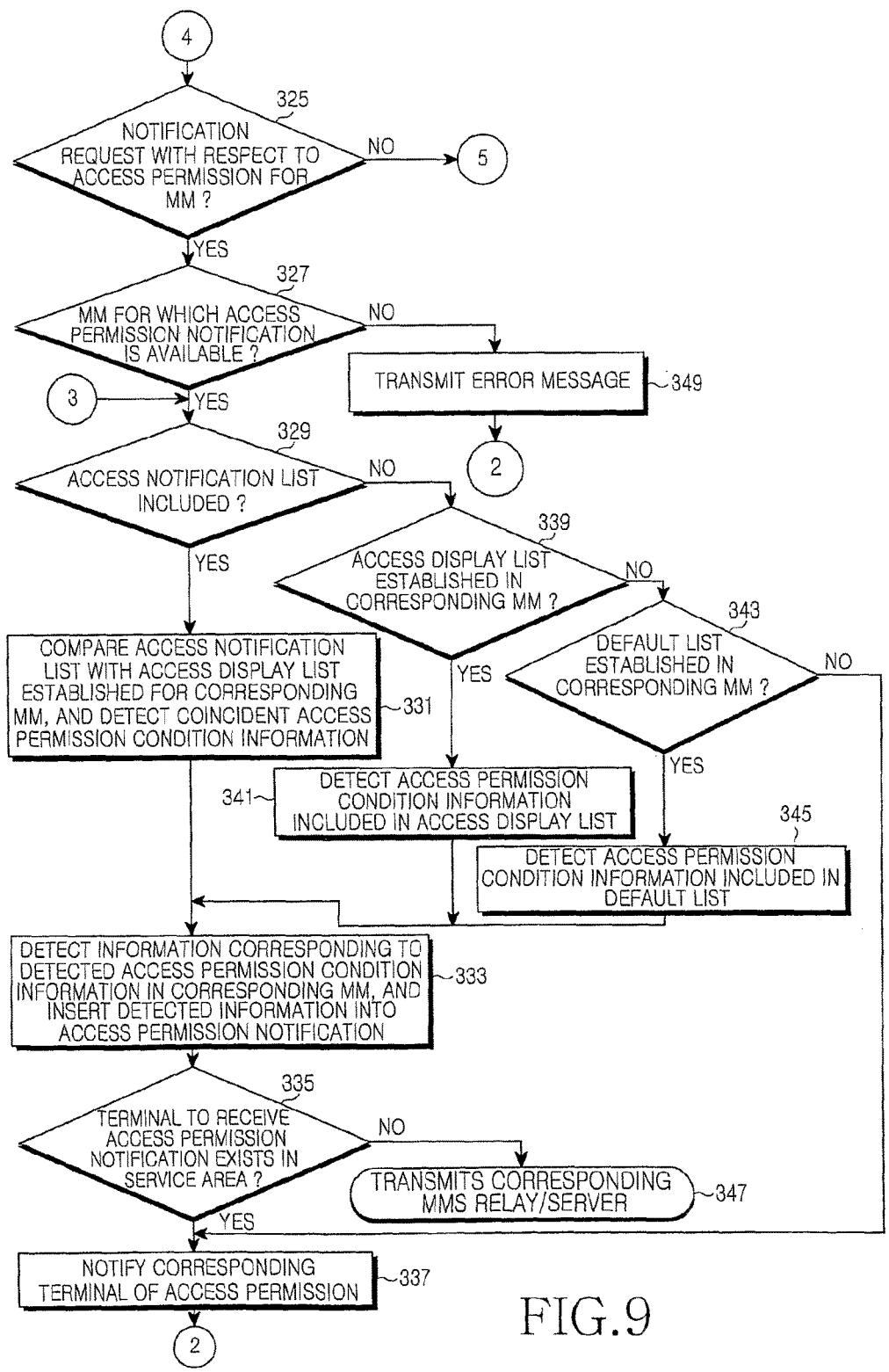
FIG. 9 is a flowchart illustrating the operation of an MMS relay/server based on an access permission notification procedure according to an embodiment of the present invention.

The MMS relay/server, which has received the access permission notification request message, performs a procedure shown in FIG. 9. FIG. 9 is a flowchart illustrating the operation of the MMS relay/server based on an access permission notification procedure according to an embodiment of the present invention. Referring to FIGS. 6 and 9, when the MMS relay/server receives an operational message relating to a multimedia message in step 301 of FIG. 6, the MMS relay/server proceeds to step 325 of FIG. 9 depending on the type of the received operational message referring to the multimedia message. In step 325, the MMS relay/server determines if the received operational message referring to the multimedia message corresponds to an access permission notification request message for a predetermined multimedia message. If it is determined that the received operational message corresponds to the access permission notification request message for the predetermined multimedia message, the MMS relay/server proceeds to step 327, and if it is determined in step 325 that the received operational message does not correspond to an access permission notification request message for a predetermined multimedia message, the MMS relay/server goes to number ⑤ to perform step 351 of FIG. 14. In step 327, the MMS relay/server determines if access permission notification is available for the predetermined multimedia message. If it is determined that access permission notification is available for the predetermined multimedia message, the MMS relay/server proceeds to step 329, and if the predetermined multimedia message is not such a message, the MMS relay/server proceeds to step 349. In step 349, the MMS relay/server transmits an error message and goes to number ② to return to step 301 of FIG. 6. In step 329, the MMS relay/server determines if the access permission notification request message includes an access notification list. Then, when the access permission notification request message includes an access notification list, the MMS relay/server proceeds to step 331, and if it does not include such a list, the MMS relay/server proceeds to step 339. In step 331, the MMS relay/server detects coincident access permission condition information between the access notification list and an access display list established for the predetermined multimedia message, by comparing the two lists, and proceeds to step 333.

Meanwhile, in step 339, the MMS relay/server determines if there is an access display list established for the predetermined multimedia message. Then, if there is an access display list established for the predetermined multimedia message, the MMS relay/server proceeds to step 341, and if such a list does not exist, the MMS relay/server proceeds to step 343. In step 341, the MMS relay/server detects access permission condition information from the access display list, and proceeds to step 333.

In step 343, the MMS relay/server determines if a default list has been established for the predetermined multimedia message. When a default list has been established for the predetermined multimedia message, the MMS relay/server proceeds to step 345, if no default list has been established, the MMS relay/server proceeds to step 337. In step 345, the MMS relay/server detects access permission condition information from the default list, and proceeds to step 333.

In step 333, the MMS relay/server detects information corresponding to the detected access permission condition information from the predetermined multimedia message, inserts the detected information into an access permission notification, and proceeds to step 335. In step 335, the MMS relay/server determines if the mobile terminal to receive the access permission notification is located within a service area. When the mobile terminal to receive the access permission notification is located within the service area, the MMS relay/server proceeds to step 337, if the mobile terminal is not located within the service area, the MMS relay/server proceeds to step 347 to transmit the access permission notification to a predetermined relay/server. In step 337, the MMS relay/server sends the access permission notification to the mobile terminal and goes to number ② to return to step 301 of FIG. 6.

Hereinafter, transaction between a mobile terminal and an MMS relay/server based on the access permission notification will be described with reference to FIGS. 10 to 12 according to embodiments of the present invention. The transaction between a mobile terminal and an MMS relay/server based on the access permission notification may be performed by only newly-added transaction, by utilizing the conventional transaction, or by a combination of the newly-added transaction and the conventional transaction.

A first embodiment of the present invention, in which all transaction required between a mobile terminal and an MMS relay/server based on the access permission notification is newly added, will be described with reference to FIG. 10. FIG. 10 is a view illustrating the flow of messages based on an access permission notification procedure according to the first embodiment of the present invention. The newly-added transaction based on the procedure shown in FIG. 10 is presented in Table 2. Table 2 presents an overview of newly-added transaction and corresponding operations based on the access permission notification procedure according to the first embodiment of the present invention. Steps associated with the newly-added transaction shown in Table 2 correspond to the steps described with reference to FIG. 8.

TABLE 2

| Step | Dedicated transaction | Description |
|------|----------------------|-------------|
| a | MM1_send_notif.REQ/RES | Request to send access permission notification about a shared MM |

TABLE 2-continued

| Step | Dedicated transaction | Description |
|---|---|---|
| a | MM1_mmbox_set_access.REQ/RES | Set access permission condition and Request transmission of access permission notification |
| b | MM4_notification.REQ/RES | Route forward the access permission notification to recipient side |
| c | MM1_notif_share.REQ/RES | Notify the recipient mobile terminal |
| d | MM1_retrieve_share.REQ | Request to retrieve the shared MM |
| e | MM4_retrieve.REQ | Route forward the request to retrieve the shared MM |
| f | MM4_retrieve.RES | Send the shared MM, having been retrieved, to recipient MMS Relay/Server |
| g | MM1_retrieve_share.RES | Pass forward the shared MM, having been retrieved, to recipient mobile terminal |

An access permission notification request of a mobile terminal may be made independently or together with an access permission establishment or change for a predetermined multimedia message. Therefore, the transaction includes MM1_send_notif.REQ/RES messages for independently requesting an access permission notification, and MM1_mmbox_set_access.REQ/RES messages for requesting an access permission notification together with an access permission establishment or change.

Referring to FIG. 8, in step "a", the first mobile terminal 10 transmits the MM1_send_notifREQ/RES message to the first MMS relay/server 30, in order to request the first MMS relay/server 30 to notify the second mobile terminal 20 that access to a predetermined multimedia message is permitted. In this case, the MM1_send_notif REQ/RES message includes information, which contains a sender address, a recipient address, location information of the predetermined multimedia message, and an access notification list. When receiving the MM1_send_notifREQ/RES message, the first MMS relay/server 30 transmits the MM1_send_notif.RES message including a response for accepting or refusing the request back to the first mobile terminal 10, and then performs the operational procedure shown in FIG. 9.

Figure 10:
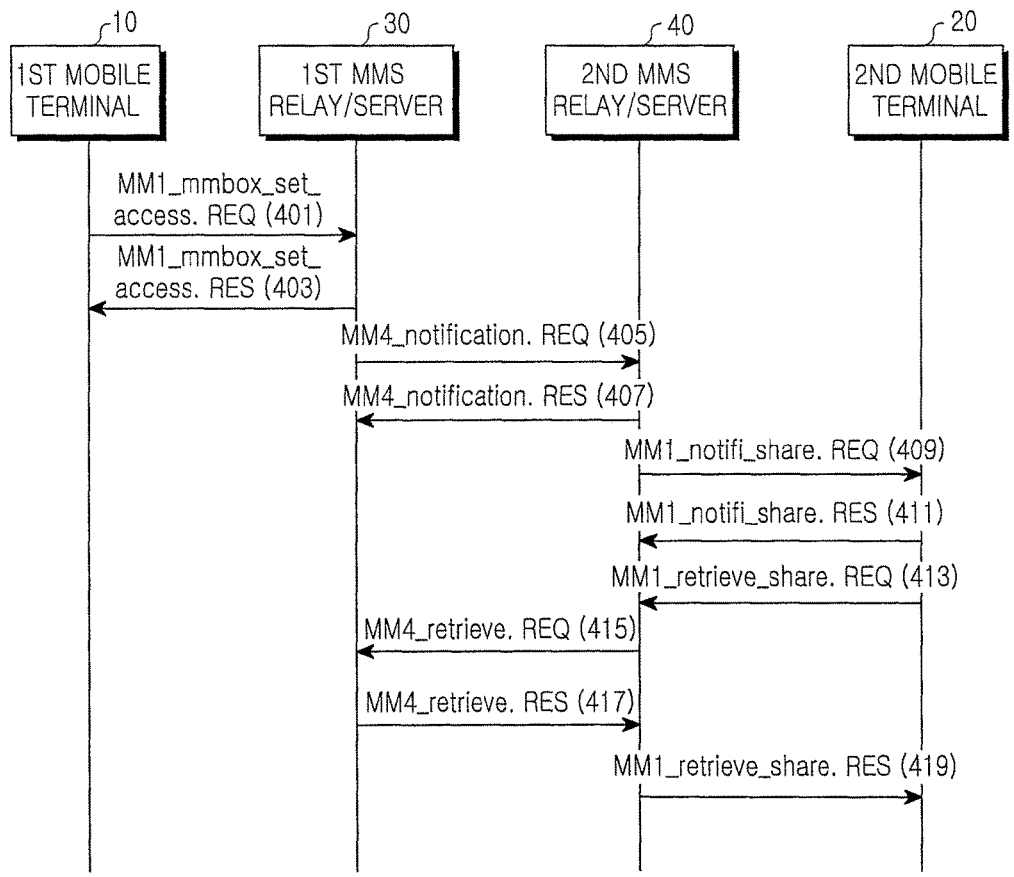
FIG. 10 is a view illustrating the flow of messages based on an access permission notification procedure according to a first embodiment of the present invention.

Referring to FIG. 10, in step 401, the first mobile terminal 10 requests the first MMS relay/server 30 to establish the access mode of a predetermined multimedia message to the restricted mode and provides information about users who can access the predetermined multimedia message. At the same time, the first mobile terminal 10 requests the first MMS relay/server 30 through the MM1_mmbox_set_access.REQ message to notify recipients included in the user information that access to the predetermined multimedia message is permitted. Therefore, the MM1_mmbox_set_access.REQ message includes a sender address, location information of the predetermined multimedia message, an access mode, access user information, access deadline information, an access display list, an access notification, an access notification list, etc.

When receiving the MM1_mmbox_set_access.REQ message, the first MMS relay/server 30 transmits an MM1_mmbox_set_access.RES message to the first mobile terminal 10 as a response message for accepting the request (step 403). Then, the first MMS relay/server 30 performs the operational procedure shown in FIG. 9, thereby inserting an access permission notification into an MM4_notification.REQ message and transmitting the MM4_notification.REQ message to the second MMS relay/server 40 in step 405. The access permission notification contains a sender address, a recipient address, and location information of a predetermined multimedia message, and also contains an access mode, access user information, and access deadline information based on information included in the notification list. The MM4_notification.REQ message has a function similar to the MM1_notification.REQ message for the conventional transaction. Herein, the application of the transaction has been extended to the transaction between originating and recipient relay/servers, since the multimedia message to be retrieved based on the procedure of FIG. 10 according to the first embodiment of the present invention resides at the originating relay/server.

When receiving the MM4_notification.REQ message, the second MMS relay/server 40 transmits an MM4_notification.RES message to the first MMS relay/server 30 in step 407 in response to the MM4_notification.REQ message, and proceeds to step 409. In step 409, the second MMS relay/server 40 transmits an MM1_notif_share.REQ message to the second mobile terminal 20 in order to notify the second mobile terminal 20 that access permission to the predetermined multimedia message has been established by the first mobile terminal 10. In step 411, the second mobile terminal 20 transmits an MM1_notif_share.RES message in response to the p MM1_notif_share.REQ message, provides the received information to its user, and proceeds to step 413. Herein, the MM1_notif_share.REQ message contains a sender address, location information of a predetermined multimedia message, and also contains access mode information, access user information, and access deadline information, which have been received through the MM4_notification.REQ message.

In step 413, the second mobile terminal 20 transmits an MM1_retrieve_share.REQ message to the second MMS relay/server 40 according to the request of the user in order to request the retrieval of a multimedia message, for which access permission notification has been received. The MM1_retrieve_share.REQ message contains a sender address, a recipient address, and location information of a predetermined multimedia message. Herein, the sender address corresponds to the address of the second mobile terminal 20, and the recipient address corresponds to the address of the first mobile terminal 10. In this case, if the second mobile terminal 20 has previously received and stored the access user information and/or access deadline information associated with the multimedia message requested to be retrieved, the second mobile terminal 20 determines if the user's retrieval request matches with the access user information and access deadline information. If the user's retrieval request does not match with the access user information and/or access deadline information, this is informed to the user. Such a determination procedure is performed also by the second MMS relay/server 40. That is, when the second MMS relay/server 40 receives the MM1_retrieve_share.REQ message in step 413, if the second MMS relay/server 40 has stored the access user information and access deadline information associated with the predetermined multimedia message, the second MMS relay/server 40 determines if the retrieval request for a predetermined multimedia message matches with the access user information and access deadline information. If it is determined that the user's retrieval request does not match with the access user information and/or access deadline information, this is informed to the user. In contrast, if it is determined that the user's retrieval request matches with the access user information and/or access deadline information, the second MMS relay/server 40 determines if the predetermined multimedia message exists in the MM box 60 connected with the second MMS relay/server 40. When it is determined that the predetermined multimedia message does not exist in the MM box 60, the second MMS relay/server 40 proceeds to step 415, in which the second MMS relay/server 40 transmits an MM4_retreive.REQ message to the first MMS relay/server 30 possessing the predetermined multimedia message, thereby requesting that the first MMS relay/server 30 retrieves the predetermined multimedia message. When receiving the MM4_retreive.REQ message, the first MMS relay/server 30 verifies whether or not the retrieval requestor (i.e. the second mobile terminal 20) is an access-permitted mobile terminal in regards to the predetermined multimedia message. When it is verified that the second mobile terminal 20 is an access-permitted mobile terminal, the first MMS relay/server 30 proceeds to step 417, in which the first MMS relay/server 30 transmits an MM4_retreive.RES message including the requested multimedia message to the second MMS relay/server 40. Herein, the MM4_retreive.REQ message contains a sender address (i.e. the address of the second mobile terminal 20) and location information of the predetermined multimedia message. The procedure of determining, by the first MMS relay/server 30, if the retrieval requestor (i.e. the second mobile terminal 20) is an access-permitted mobile terminal in regards to the predetermined multimedia message is as follows. First, the first MMS relay/server 30 verifies whether or not the requested multimedia message exists in the first MM box 50 connected with the first MMS relay/server 30. When it is verified that the requested multimedia message exists in the first MM box 50, the first MMS relay/server 30 checks the access mode of the predetermined multimedia message so as to determine if the predetermined multimedia message can be shared. When the access mode of the predetermined multimedia message is established as the restricted mode, the first MMS relay/server 30 verifies whether or not the sender address is included in access user information associated with the predetermined multimedia message. When the access deadline for the predetermined multimedia message has been established, the first MMS relay/server 30 verifies whether or not the established access deadline has expired. When such all conditions are satisfied, the first MMS relay/server 30 transmits the predetermined multimedia message together with an MM4_retrieve.RES message, by inserting the predetermined multimedia message into the body portion of the MM4_retrieve.RES message. In this case, if there is an access display list established for the requested multimedia message, the first MMS relay/server 30 inserts access permission condition information included in the access display list into the header of the MM4_retrieve.RES message to be transmitted.

Accordingly, the MM4_retrieve.RES message contains the sender address (i.e. the address of the first mobile terminal 10), the recipient address (i.e. the address of the second mobile terminal 20), and the predetermined multimedia message, and additionally, may contain access mode information, access user information, and access deadline information according to circumstances.

When receiving the MM4_retrieve.RES message in step 417, the second MMS relay/server 40 transmits an MM1_retrieve_share.RES message to the second mobile terminal 20, thereby responding to the retrieval request of the second mobile terminal 20. The MM1_retrieve_share.RES message contains the sender address (i.e. the address of the first mobile terminal 10), the recipient address (i.e. the address of the second mobile terminal 20), and the predetermined multimedia message, and additionally, may contain access mode information, access user information, and access deadline information if these information elements are included in the MM4_retrieve.RES message. When receiving the MM1_retrieve_share.RES message, the second mobile terminal 20 displays the received information so that the user can view the received information.

Next, a procedure of notifying a mobile terminal of access permission for a multimedia message by using the conventional transaction according to a second embodiment of the present invention will be described with reference to FIG. 11. FIG. 11 is a view illustrating the flow of messages based on an access permission notification procedure according to the second embodiment of the present invention. Table 3 presents an overview of the conventional transaction, which is used for the procedure shown in FIG. 11, while being mapped with the newly-added transaction based on the first embodiment of the present invention.

TABLE 3

| Step | Added Transaction | Corresponding Conventional Transaction |
|---|---|---|
| 1 | MM1_send_notif.REQ/RES | MM1_submit.REQ/RES |
| 1b | MM1_mmbox_set_access.REQ/RES | MM1_mmbox_upload.REQ/RES or MM1_mmbox_store.REQ/RES |
| 2 | MM4_notification.REQ/RES | MM4_forward.REQ |
| 3 | MM1_notif_share.REQ/RES | MM1_notification.REQ |
| 4 | MM1_retrieve_share.REQ | MM1_retrieve.REQ |
| 5 | MM4_retrieve.REQ | — |
| 6 | MM4_retrieve.RES | — |
| 7 | MM1_retrieve_share.RES | MM1_retrieve.RES |

Figure 11:
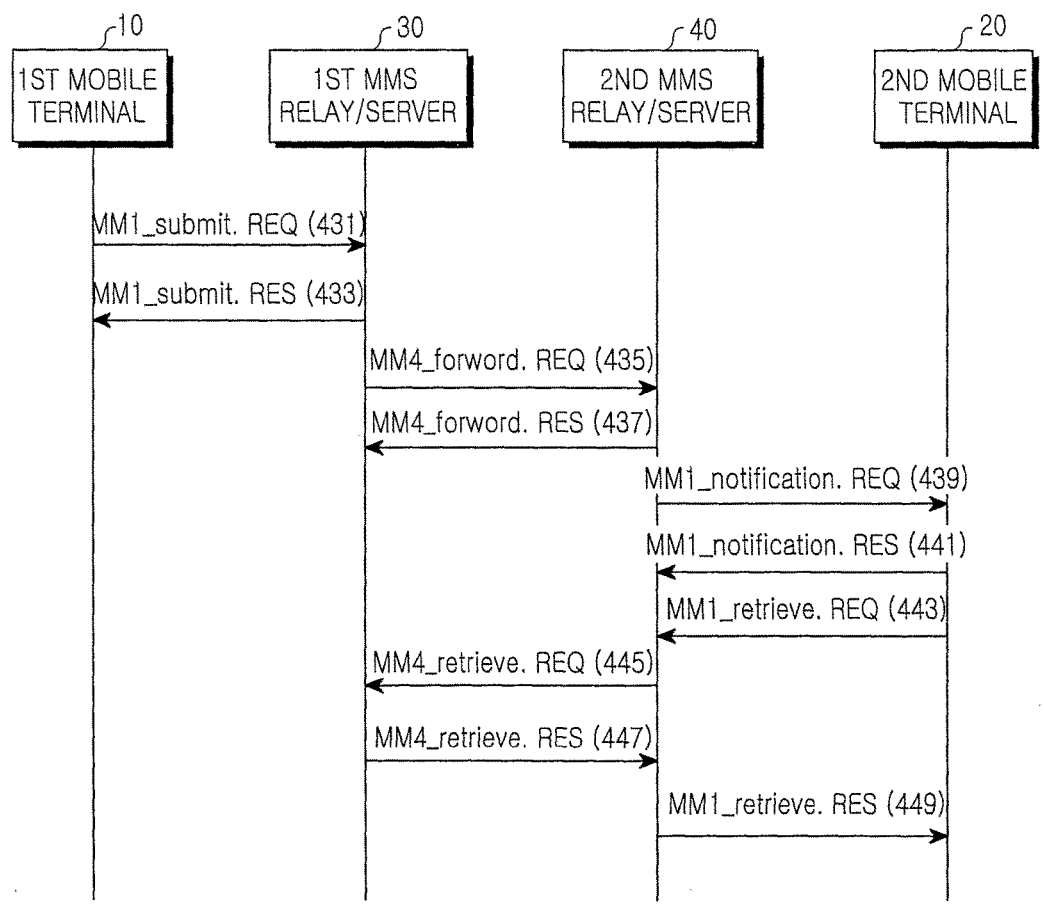
FIG. 11 is a view illustrating the flow of messages based on an access permission notification procedure according to a second embodiment of the present invention.
Figure 12:
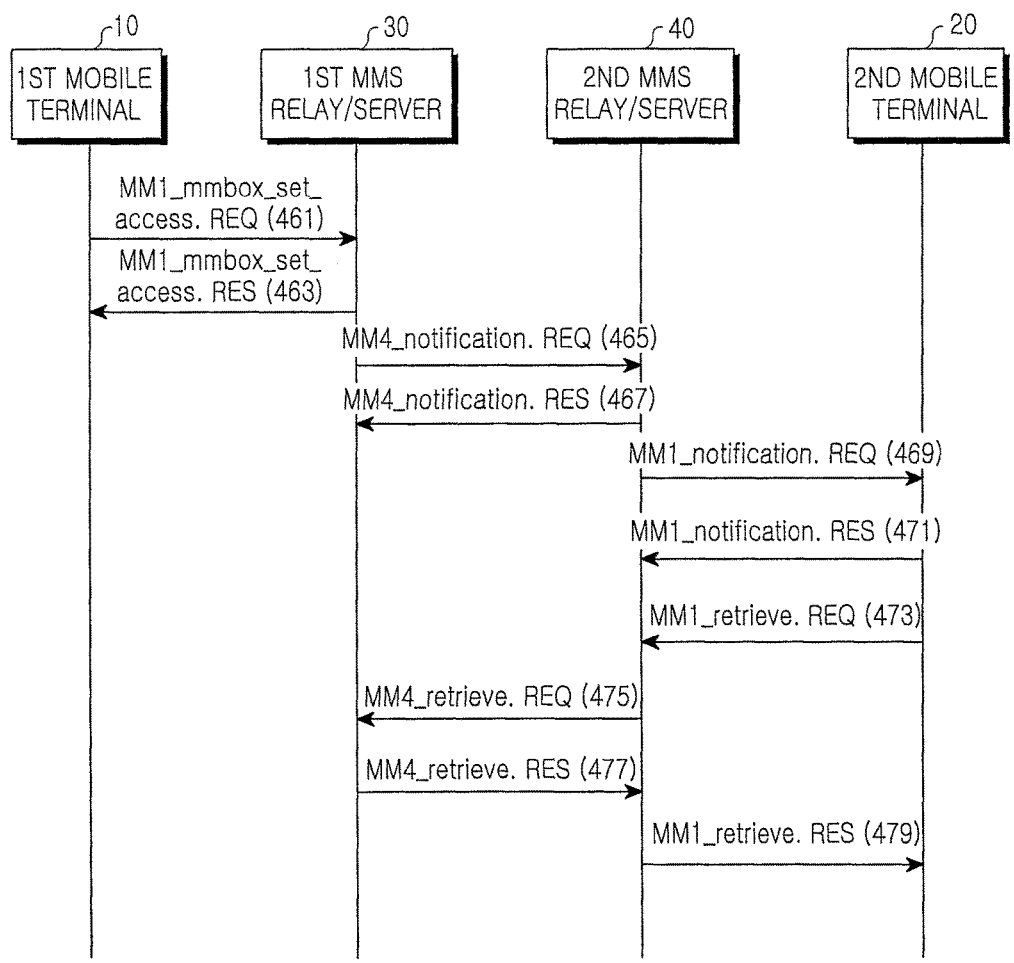
FIG. 12 is a view illustrating the flow of messages based on an access permission notification procedure according to a third embodiment of the present invention.

Referring to FIG. 11, in step 431, the first mobile terminal 10 transmits an MM1_submit.REQ message to the first MMS relay/server 30, in order to requests the first MMS relay/server 30 to notify the second mobile terminal 20 that access to a predetermined multimedia message is permitted. When receiving the MM1_submit.REQ message, the first MMS relay/server 30 transmits an MM1_submit.RES message in response to the MM1_submit.REQ message of the first mobile terminal 10, thereby notifying the first mobile terminal 10 that the access permission notification request has been accepted.

The MM1_submit.REQ message contains a sender address, a recipient address, location information of the predetermined multimedia message, an access notification list, and a share-permission-related value for the predetermined multimedia message. Since such an MM1_submit.REQ message is transmitted originally with a multimedia message, the MM1_submit.REQ message must include the share-permission-related value for the predetermined multimedia message so as to distinguish the case of using the MM1_submit.REQ message as an access permission notification request message from the original use. Accordingly, when receiving the MM1_submit.REQ message, the first MMS relay/server 30 must verify whether or not the share-permission-related value for the multimedia message is "yes". When the share-permission-related value for the multimedia message is "yes", the first MMS relay/server 30 performs the same operation as it does when receiving the MM1_send_notif.REQ message.

Although it is not shown in FIG. 11, in step 431, the first mobile terminal 10 may establish access permission by transmitting an MM1_mmbox_upload.REQ message and thereby request an access permission notification. When receiving the MM1_mmbox_upload.REQ message, the first MMS relay/server 30 transmits an MM1_mmbox_upload.RES message to the first mobile terminal 10 in response to the MM1_mmbox_upload.REQ message. The MM1_mmbox_upload.REQ message contains a sender address, an access mode, access user information, access deadline information, an access display list, an access notification, an access notification list, and a multimedia message to be uploaded. When receiving the MM1_mmbox_upload.REQ message, the first MMS relay/server 30 stores a received multimedia message in an MM box, and transmits location information of the stored multimedia message to the first mobile terminal 10. Then, the first MMS relay/server 30 performs the operations relating to an access permission condition establishment and the notification to access-permitted mobile terminals in the same manner as it does when receiving the MM1_mmbox_set_access.REQ message.

Also, although it is not shown in FIG. 11, in step 431, the first mobile terminal 10 may establish access permission by transmitting an MM1_mmbox_store.REQ message and thereby request an access permission notification. The MM1_mmbox_store.REQ message contains the same information as that of the MM1_mmbox_set_access.REQ message. The first mobile terminal 10 may request the MMS relay/server not to change access permission establishment for a predetermined multimedia message and to transmit a notification about the access permission to the predetermined multimedia message, by inserting only a sender address, location information of a multimedia message in an MM box, an access notification, and an access notification list in the MM1_mmbox_store.REQ message.

Referring again to FIG. 11, in step 435, the first MMS relay/server 30 transmits an MM4_forward.REQ message to the second MMS relay/server 40, thereby notifying the second MMS relay/server 40 of the access permission. That is, the first MMS relay/server 30 inserts access permission notification information into the MM4_forward.REQ message by performing the procedure shown in FIG. 9, and transmits the MM4_forward.REQ message to the second MMS relay/server 40. The access permission notification information contains a sender address, a recipient address, and location information of the predetermined multimedia message, and additionally, may contain an access mode, access user information, and access deadline information based on information included in the notification list. Also, the MM4_forward.REQ message contains a share-permission-related value for the predetermined multimedia message because of the same reason as the MM1_submit.REQ message. Accordingly, when receiving the MM4_forward.REQ message, the second MMS relay/server 40 detects the shared-multimedia-message from the received MM4_forward.REQ message first of all, identifies the purpose of the MM4_forward.REQ message, and processes the MM4_forward.REQ message based on the purpose.

The second MMS relay/server 40 transmits an MM4_forward.RES message in step 437 in response to the MM4_forward.REQ message, and proceeds to step 439. In step 439, the second MMS relay/server 40 transmits an MM1_notification.REQ message to the second mobile terminal 20, thereby notifying the second mobile terminal 20 of the establishment of access permission to the predetermined multimedia message. When receiving the MM1_notification.REQ message, the second mobile terminal 20 transmits an MM1_notification.RES message to the second MMS relay/server 40 in step 441 in response to the MM1_notification.REQ message. The MM1_notification.REQ message contains a sender address and location information of the predetermined multimedia message, and also contains access mode information, access user information, access deadline information, and a share-permission-related value for the predetermined multimedia message which have been received through the MM4_forward.REQ message.

Thereafter, in step 443, the second mobile terminal 20 transmits an MM1_retrieve.REQ message to second MMS relay/server 40, thereby requesting retrieval of the predetermined multimedia message. The MM1_retrieve.REQ message contains the same information as the MM1_retrieve_share.REQ message. Herein, the operational procedure of the second mobile terminal 20 for transmitting the MM1_retrieve.REQ message and the operational procedure of the second MMS relay/server 40 having received the MM1_retrieve.REQ message are identical to the operational procedure of the second mobile terminal 20 for transmitting the MM1_retieve_share.REQ message and the operational procedure of the second MMS relay/server 40 having received the MM1_retrieve_share.REQ message, which are shown in FIG. 10, respectively.

When receiving the MM1_retrieve.REQ message, the second MMS relay/server 40 transmits the MM4_retrieve.REQ message to the first MMS relay/server 30 in step 445, thereby requesting retrieval of the predetermined multimedia message. The first MMS relay/server 30 performs the operation based on the request, inserts a result of the performance into an MM4_retrieve.RES message, and transmits the MM4_retrieve.RES message to the second MMS relay/server 40 in step 447. The procedure of steps 445 and 447 are identical to that of steps 415 and 417 of FIG. 10.

When receiving the MM4_retrieve.RES message, the second MMS relay/server 40 transmits an MM1_retrieve.RES message to the second mobile terminal 20 in step 449, thereby transmitting the retrieved multimedia message. The MM1_retrieve.RES message contains the same information as that of the MM1_retrieve_share.REQ message, and the operations of the second MMS relay/server 40 and second mobile terminal 20 for processing the MM1_retrieve.RES message are same as those of the second MMS relay/server 40 and second mobile terminal 20 for processing the MM1_retrieve_share.REQ message.

Next, a procedure of notifying a mobile terminal of access permission by using a combination of the conventional transaction and newly-added transaction according to a third embodiment of the present invention will be described with reference to FIG. 12. FIG. 12 is a view illustrating the flow of messages based on an access permission notification procedure according to the third embodiment of the present invention. In this embodiment of the present invention, the choice of the transaction for each step is independent on the transaction chosen in the previous or next step. In other words, it is possible to combine the conventional transaction and newly-added transaction in different ways. Referring to FIG. 12, the first mobile terminal 10 and the first MMS relay/server 30 use added MM1_mmbox_set_access.REQ/RES transaction in order to request/respond an access permission notification (steps 461 and 463), and use added MM4_notification.REQ/RES transaction in order to forward the access permission notification from the first MMS relay/server 30 to the second MMS relay/server 40 (steps 465 and 467). Then, in steps 469 and 471, the conventional MM1_notification.REQ/RES transaction is used to forward the access permission notification from the second MMS relay/server 40 to the second mobile terminal 20. Thereafter, the second mobile terminal 20 requests the retrieval of a multimedia message to which access is permitted, by using the conventional MM1_retrieve.REQ transaction (step 473). In steps 475 and 477, the first MMS relay/server 30 and the second MMS relay/server 40 use added MM4_retrieve.REQ/RES transaction in order to transmit the retrieval request from the second MMS relay/server 40 to the first MMS relay/server 30 and to retrieve the multimedia message to which access is permitted. In step 479, the conventional MM1_retrieve.RES transaction is used for the second mobile terminal 20 to transmit the requested multimedia message, to which access is permitted, to the second mobile terminal 20.

The above description referring to FIGS. 8 to 12 has been given about the procedures of notifying a mobile terminal that access to a predetermined multimedia message is permitted. The following description will be given about a procedure of notifying a mobile terminal that access permission established for a predetermined multimedia message is revoked.

A revocation notification concerning access permission may be performed by means of newly-added information elements or by means of the conventional information elements. In the case of using the newly-added information elements, the revocation notification concerning access permission is achieved by inserting the above-mentioned access-permission-related information into appropriate transaction. The access-permission-related information may take one of two values of "yes" and "no", in which the "yes" represents that access to a predetermined multimedia message is permitted, and the "no" represents that access permission previously established for a predetermined multimedia message is revoked. Herein, the default value is established as "yes". Therefore, when an access permission notification transaction including the value of the access-permission-related information established as "no", a recipient-side user can understand that his/her own access authority has been revoked.

A method of inserting the access-permission-related information into a transaction will now be described. When access to a predetermined multimedia message is permitted, the access-permission-related information does not need to be specified in any transaction if the default value is "yes". However, when access permission to a predetermined multimedia message is revoked, the access-permission-related information must be included in a transaction transmitted to a recipient-side terminal or a MMS relay/server connected to the recipient-side terminal so as to notify the recipient-side terminal of the revocation of access permission. To this end, the MM1_notification.REQ message and the MM4_notification.REQ message added according to an embodiment of the present invention include the access-permission-related information. Also, it is possible that the owner of a predetermined multimedia message notifies a mobile terminal granted access a predetermined multimedia message that the access permission is revoked, by inserting the access-permission-related information into an MM1_send_notif.REQ message and an MM1_mmbox_set_access.REQ message.

The procedure of notifying a mobile terminal that access permission is revoked by using the conventional transaction is similar to the procedure of notifying a mobile terminal that access permission is revoked by using the added transaction. For instance, the access-permission-related information may be included in an MM4_forward.REQ message and an MM1_notification.REQ message. If an MMS relay/server which receives the access revocation notification request can determine if the notification concerns an authorization or a revocation, "authorized access" can optionally be present. Also, the access-permission-related information may optionally be included in an MM1_submit.REQ message or MM1_mmbox_upload.REQ message.

The revocation notification concerning access permission may be performed through transmission of information elements. Access permission established for a predetermined multimedia message may be revoked for various reasons. For example, the access permission is revoked when the access deadline for the predetermined multimedia message has expired (first case), when the access mode of for the predetermined multimedia message is changed to the private mode (second case), and when a corresponding user is removed from the access user information of the predetermined multimedia message (third case).

When the first case occurs, it is possible to notify the corresponding mobile terminal that access permission has been revoked by transmitting the access deadline information of the predetermined multimedia message to the corresponding mobile terminal. When the second case occurs, it is possible to notify the corresponding mobile terminal that access permission has been revoked by transmitting the access mode information of the predetermined multimedia message to the corresponding mobile terminal. When the third case occurs, updated access user information associated with the predetermined multimedia message is transmitted to a mobile terminal for which the access permission has been revoked. However, in this case, the provision of the access user information may raise an important privacy issue because the access user information includes various information about other users. Therefore, it is preferred that the sensitive information (e.g. access mode information and/or access deadline information) which is to be provided to a corresponding user is replaced with a value representing that access permission has been revoked, thereby notifying the corresponding user that access permission has been revoked. In the above-mentioned cases, the access mode information and/or access deadline information must have been provided through an access display list.

Hereinafter, the procedure of searching for a multimedia message stored in an MM box according to an embodiment of the present invention will be described with reference to FIGS. 13 to 15. The above description has been given with respect to the procedure of retrieving only a multimedia message for which access permission has been notified. If the access mode of a multimedia message is established as the public, it is impossible to send an access permission notification to everybody. Therefore, a procedure in which a mobile terminal searches for a multimedia message stored in an MM box without an access permission notification will now be described).

First, the operation of an MMS system based on a multimedia message search procedure will be described with reference to FIG. 13. FIG. 13 is a view illustrating a procedure of searching for a multimedia message according to an embodiment of the present invention. In step "k", the first mobile terminal 10 establishes the access mode of a predetermined multimedia message as the public mode, associates, for example the keyword "Australia", with the predetermined multimedia message, and uploads the predetermined multimedia message to the first MMS relay/server 30. In step "l", the second mobile terminal 20 transmits a search request for multimedia messages associated with the keyword "Australia" to the second MMS relay/server 40. In step "m", the second MMS relay/server 40 searches its own MM box for multimedia messages associated with the keyword "Australia", and transmits a search request for multimedia messages associated with the keyword "Australia" to a different MMS relay/server, that is, to the first MMS relay/server 30. Then, the first MMS relay/server 30 searches for multimedia messages associated with the keyword "Australia" based on the multimedia message search request and transmits found multimedia messages to the second MMS relay/server 40 in step "n". Next, the second MMS relay/server 40 gathers the multimedia message found by its own search and the multimedia messages received from the first MMS relay/server 30, and transmits the gathered multimedia messages to the second mobile terminal 20 in step "o".

In order to search for multimedia messages, as described above, the multimedia message search request to be transmitted contains a location information list of multimedia messages, search scope information, search address information, and a requestor address.

The location information list of multimedia messages contains a list of locations of predetermined multimedia messages. Therefore, when the location information list of multimedia messages has been established, predetermined multimedia messages included in the established location information list are searched for. If no location information list of multimedia messages has been established, the search scope and the search addresses must be established.

The search scope stipulates a search scope of the multimedia messages, and can take one of three values of "private", "restricted" and "global". The term "private" represents that only the MM box account for the user of a mobile terminal which makes the search request is established as a search scope. Herein, the account means the set of multimedia messages stored in an MM box belonging to a particular user. The term "restricted" represents that only specific users' MM box accounts have been established as a search scope. The term "global" represents that all users' accounts have been established as a search scope.

The search address provides the list of particular users' addresses included in a search scope when the search scope is established as "restricted", and the MM box accounts corresponding to the addresses must be searched for.

The requestor address represents the address of an originator (i.e. a mobile terminal) which requests a multimedia message search. The requestor address is usefully used when the location information list of multimedia messages includes a multimedia message existing outside the MM box of the search requestor. When the search scope has been established as "restricted" or "global", an MMS relay/server receiving the search request uses the requestor address in order to check if the search requestor has the right to get information about a particular MM box.

Apart from the information elements described above, access mode information, access user information, and access deadline information can be used in order to establish a multimedia message which is to be searched for or in order to filter criteria for specific information desired to be provided from among information associated with a found multimedia message. Before such information is provided to a requesting user, the requesting user is first authorized through an access display list by the owner of the multimedia message.

When requesting a search for a multimedia message according to the request of the user, a mobile terminal inserts the above-mentioned information into the search request for the multimedia message.

Figure 14:
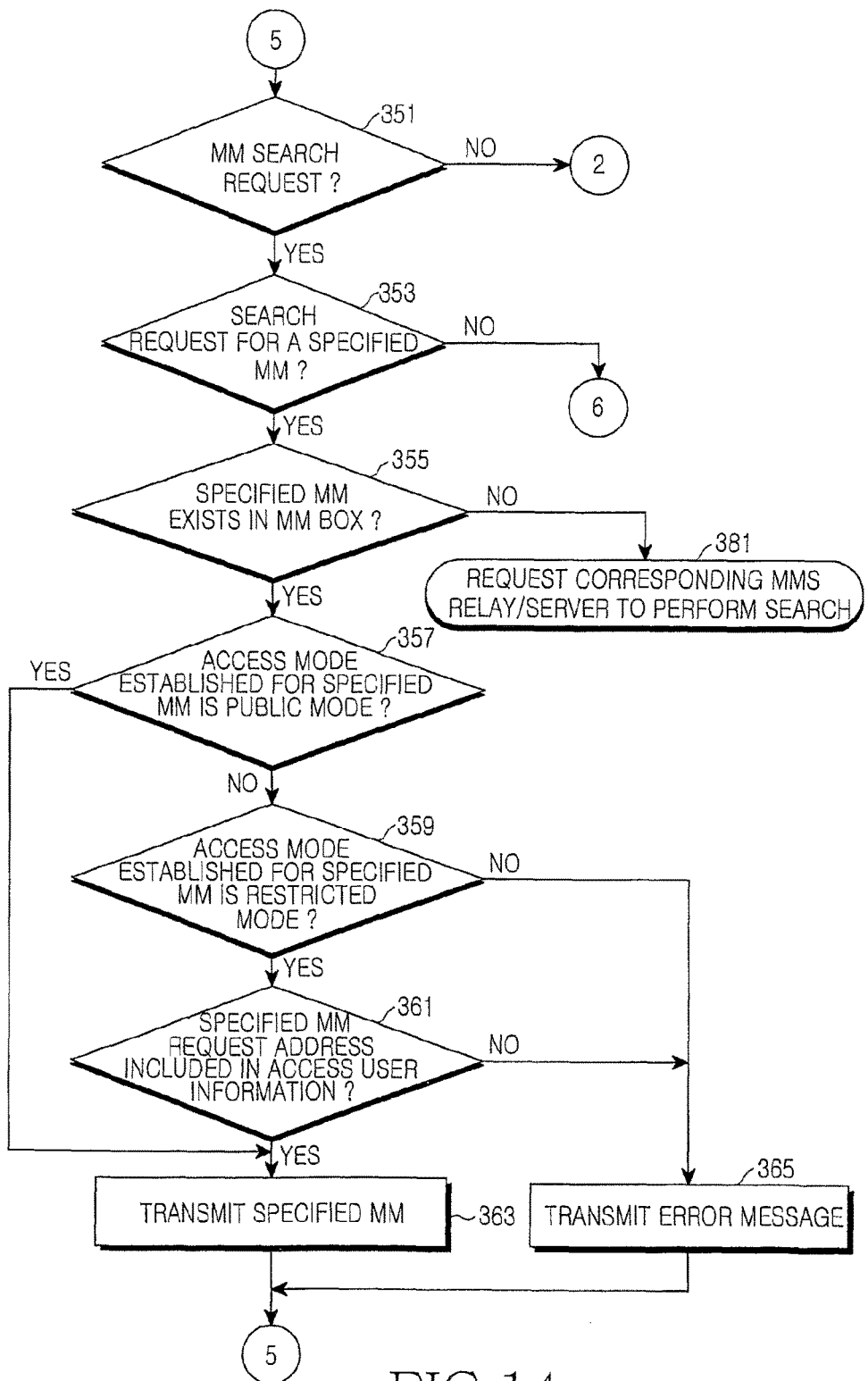
FIGS. 14 and 15 are flowcharts illustrating the operation of an MMS relay/server based on a multimedia message search procedure according to an embodiment of the present invention.
Figure 15:
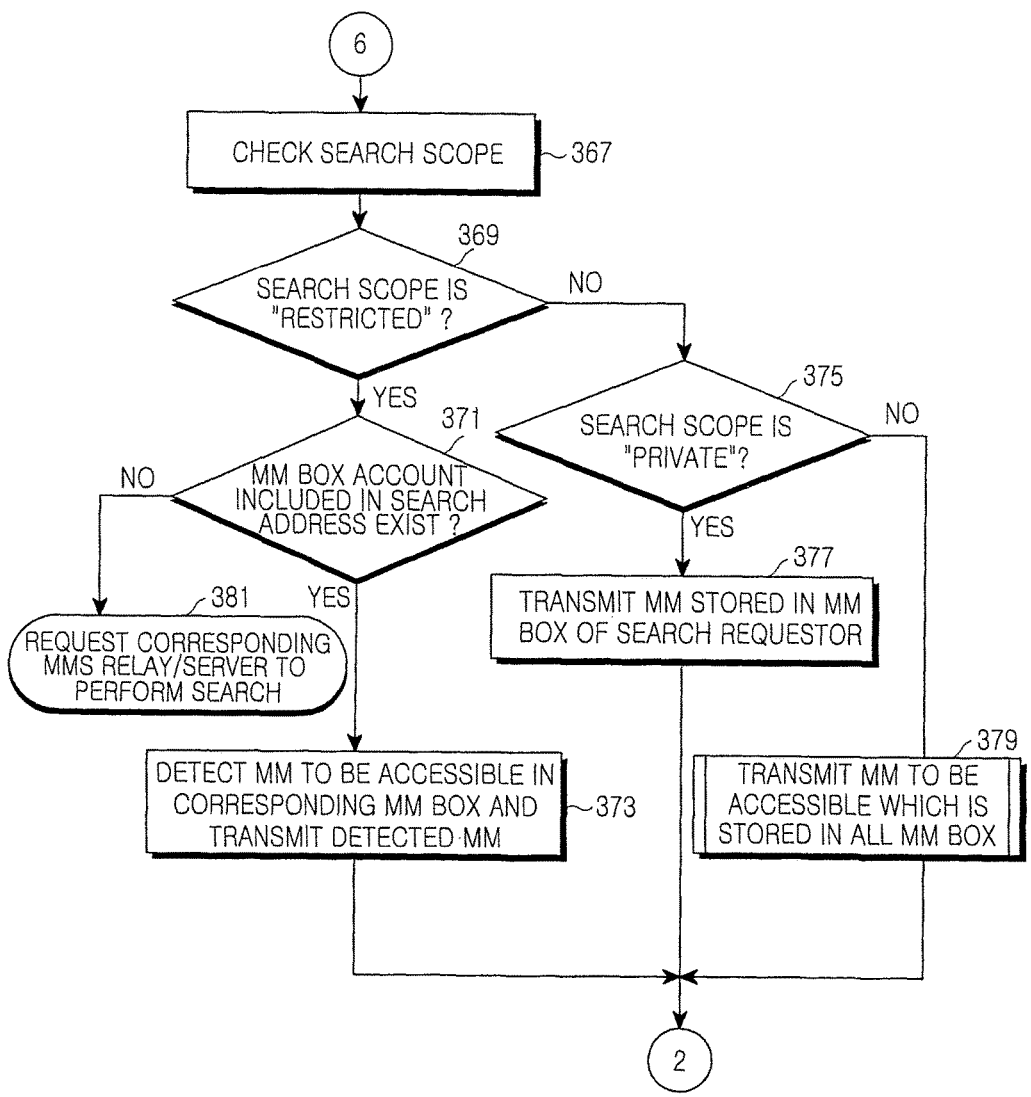

When a search for a multimedia message is requested, an MMS relay/server operates based on a procedure shown in FIGS. 14 and 15. FIGS. 14 and 15 are flowcharts illustrating the operation of an MMS relay/server based on a multimedia message search procedure according to an embodiment of the present invention. Referring to FIGS. 6, 14 and 15, when receiving a request for a multimedia message service (MMS) in step 301 of FIG. 6, the MMS relay/server identifies the received request as an MMS-related request and proceeds to step 351 of FIG. 14. In step 351, the MMS relay/server determines if the MMS-related request corresponds to a multimedia message search request. If it is determined in step 351 that the MMS-related request corresponds to a multimedia message search request, the MMS relay/server proceeds to step 353, but if it is not a multimedia message search request, the MMS relay/server goes to number ② to return to step 301 of FIG. 6. In step 353, the MMS relay/server determines if a multimedia message location information list has been established in the multimedia message search request, thereby identifying if the multimedia message search request corresponds to a search request for a specified multimedia message. If the multimedia message search request corresponds to a search request for a specified multimedia message, the MMS relay/server proceeds to step 355, but if it is a search request for a non-specified multimedia message, the MMS relay/server goes to number ⑥ to proceed to step 369 of FIG. 15. In step 355, the MMS relay/server determines if the specified multimedia message exists in an MM box connected to the MMS relay/server. If the specified multimedia message exists in the MM box, the MMS relay/server proceeds to step 357, but if it does not exist in the MM box, the MMS relay/server proceeds to step 381 in which the MMS relay/server requests a different MMS relay/server to search for the specified multimedia message.

In step 357, the MMS relay/server checks if the access mode established for the specified multimedia message is the public mode. If the access mode established for the specified multimedia message is the public mode, the MMS relay/server proceeds to step 363, but if it is a non-public mode, the MMS relay/server proceeds to step 359. In step 359, the MMS relay/server checks if the access mode established for the specified multimedia message is the restricted mode. If the access mode established for the specified multimedia message is the restricted mode, the MMS relay/server proceeds to step 361, but if it is not a restricted mode, the MMS relay/server proceeds to step 365. When it is determined as the checking results of steps 357 and 359 that the access mode established for the specified multimedia message is neither the public mode nor the restricted mode, this means that the access mode of the specified multimedia message is the private mode. In this case, since the specified multimedia message of the private mode cannot be searched for to be provided, the MMS relay/server transmits an error message in step 365, and goes to number ② to return to step 301 of FIG. 6. In step 363, the MMS relay/server transmits either the specified multimedia message or information about the specified multimedia message, and goes to number ② to return to step 301 of FIG. 6.

Meanwhile, the MMS relay/server, which has determined that the access mode of the specified multimedia message is the restricted mode, checks if the address of the search requestor for the specified multimedia message is contained in access user information established for the specified multimedia message (step 361). If the address of the search requestor is contained in the access user information, the MMS relay/server proceeds to step 363, but if the search requestor is not contained in the access user information, the MMS relay/server proceeds to step 365. In step 363, the MMS relay/server transmits the specified multimedia message to the terminal of the search requestor and goes to number ② to return to step 301 of FIG. 6.

Meanwhile, when it is determined in step 353 that the multimedia message search request is not aimed at a specified multimedia message, the MMS relay/server identifies a search scope contained in the multimedia message search request (step 367 of FIG. 15), and proceeds to step 369. In step 369, the MMS relay/server determines if the search scope is established as "restricted". If the search scope is established as "restricted", the MMS relay/server proceeds to step 375, but if it is not established as "restricted", the MMS relay/server proceeds to step 375. In step 371, the MMS relay/server checks if an MM box account corresponding to a search address contained in the multimedia message search request exists in the MM box connected to the MMS relay/server. If the MM box account exists in the MM box, the MMS relay/server proceeds to step 373, but if the MM box account does not exist in the MM box, the MMS relay/server proceeds to step 381 in which the MMS relay/server requests a different MMS relay/server to search a corresponding multimedia message. In step 375, the MMS relay/server determines if the search scope is established as "private". If the search scope is established as "private", the MMS relay/server proceeds to step 377, but if it is not established as "private", the MMS relay/server proceeds to step 379. In step 377, the MMS relay/server detects and transmits a multimedia message stored in the MM box storage area of the search requestor, and goes to number ② to return to step 301 of FIG. 6. In step 379, the MMS relay/server detects and transmits access-permitted multimedia messages stored in all MM boxes to the search requestor, and goes to number ② to return to step 301 of FIG. 6. Herein, the "access-permitted multimedia messages" represents multimedia messages, of which the access modes are established as "restricted" or "public", and for which the access user information contains the address of the requestor when their access modes have been established as "restricted".

The transaction based on the multimedia message search procedure is shown in Table 4.

TABLE 4

| Step | Transaction | Description |
|---|---|---|
| k | MM1_mmbox_upload. REQ/RES | Upload MM + set access permission to "public" |
| l | MM1_mmbox_view.REQ | Request to search for available MMs |
| m | MM4_mmbox_view.REQ | Forward the search request to other Relay/Servers |
| n | MM4_mmbox_view.RES | Response received from other Relay/Servers |
| o | MM1_mmbox_view.RES | Gather responses + send answer back to requestor |

Figure 13:
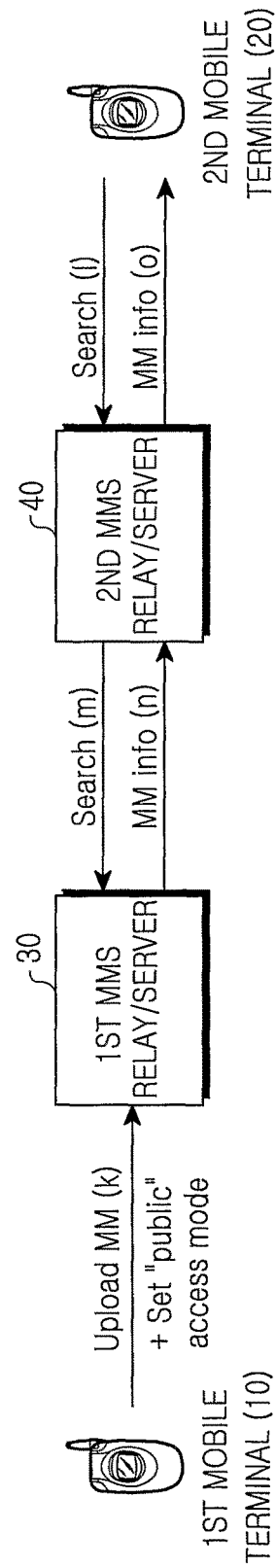
FIG. 13 is a view illustrating a procedure of searching for a multimedia message according to an embodiment of the present invention.

Steps of Table 4 correspond to steps of FIG. 13. In step "k", the MM1_mmbox_upload.REQ/RES transaction performed in step "k" is same as that described above, in which a multimedia message is uploaded and the access mode of the uploaded multimedia message is established as a public mode according to an embodiment of the present invention.

In step "l", the second mobile terminal 20 transmits an MM1_mmbox_view.REQ message to the second MMS relay/server 40, thereby requesting the second MMS relay/server 40 to provide the second mobile terminal 20 with a list of all or part of multimedia messages currently stored in the user's MM box, as well as with information about the multimedia messages themselves. In addition to the above, the MM1_mmbox_view.REQ message contains a selection item for enabling the second mobile terminal 20 to extend the range of the multimedia message search to other users' MM boxes as well. The MM1_mmbox_view.REQ message contains a message reference list (multimedia message location information list), a search scope, a search address, a requestor address, an access mode, access user information, and access deadline based on establishment of the search requestor.

In this case, if the multimedia message location information list is specified, the second mobile terminal 20 does not specify the search scope and the search address. The search address is specified only when the search scope is established as "restricted". The second mobile terminal 20 must specify the requestor address only if the multimedia message location information list contains location information outside the MM box storage area of the search requestor, or if the search scope is established as "restricted" or "public". In addition, the second mobile terminal 20 must establish the access mode, access user information, and access deadline based on the following conditions. That is, the access mode, access user information, and access deadline are included in the selection criteria of the MM1_mmbox_view.REQ only if it is requested by the user. Also, the access mode, access user information, and access deadline are listed in the attribute list of the MM1_mmbox_view.REQ if it is requested by the user that they be displayed in a response to the search request.

When receiving the MM1_mmbox_view.REQ message, the second MMS relay/server 40 searches for an MMS relay/server corresponding to location information included in a multimedia message location information list when the multimedia message location information list has been specified in the MM1_mmbox_view.REQ message. When the location information of the multimedia message location information list corresponds to a different MMS relay/server, the second MMS relay/server 40 transmits an MM4_mmbox_view.REQ message to the different MMS relay/server, thereby requesting the search. In contrast, when the location information of the multimedia message location information list corresponds to the second MMS relay/server 40 itself, the second MMS relay/server 40 detects the requested multimedia message. Then, second MMS relay/server 40 performs steps 357 to 365 of FIG. 14 based on the access mode established in the multimedia message, thereby transmitting an access-permitted multimedia message.

In this case, from among access permission condition information established for the access-permitted multimedia message, only access permission condition information matching with access permission conditions included in a previously established access display list is selected and transmitted. If no access permission condition is contained in the access display list, the access permission condition information must be presented as being "hidden", or access permission condition information included in a default list is selected and transmitted if the default list exists.

If a specific multimedia message is supposed to be located in the current MMS relay/server (i.e. in the second MMS relay/server 40), but cannot be found, an error message is transmitted from the second MMS relay/server 40 to the second mobile terminal 20.

Meanwhile, when the multimedia message location information list is not established in the MM1_mmbox_view.REQ message, the second MMS relay/server 40 checks the search scope. If the search scope is established as "private", the second MMS relay/server 40 searches for multimedia messages stored in the MM box of the search requestor and provides the found multimedia message.

If the search scope is established as "restricted", the second MMS relay/server 40 checks the search address list. Then, the second MMS relay/server 40 performs the following tasks with respect to each address contained in the search address list. The second MMS relay/server 40 checks where the user's account corresponding to each address is located. Then, if the checked user's account is associated with a different MMS relay/server, the second MMS relay/server 40 transmits an MM4_mmbox_view.REQ message to the different MMS relay/server, thereby requesting the different MMS relay/server to search for the corresponding multimedia message. In contrast, if the user's account is maintained by the second MMS relay/server 40 itself, the second MMS relay/server 40 detects an access-permitted multimedia message based on the multimedia message access permission conditions stored by the user.

If the search scope is established as "global", the second MMS relay/server 40 checks the MM box accounts of all users, and requests different MMS relay/servers to search for the corresponding multimedia messages.

In step "m", the second MMS relay/server 40 transmits an MM4_mmbox_view.REQ message to the first MMS relay/server 30, thereby notifying the first MMS relay/server 30 that the MM box of the first mobile terminal 10 is connected with the first MMS relay/server 30, and transmitting the multimedia message search request of the second mobile terminal 20 to the first MMS relay/server 30. The operational procedure of the first MMS relay/server 30 is similar to that of the second MMS relay/server 40, except that the first MMS relay/server 30 transmits an error message to the second MMS relay/server 40 when receiving a request with a search scope established as "private".

Thereafter, when having completed the search for a corresponding multimedia message, the first MMS relay/server 30 transmits the found multimedia message in step "n" by inserting the found multimedia message into an MM4_mmbox_view.RES message. The MM4_mmbox_view.RES message contains location information of the multimedia message to be transmitted, the address of the owner of the multimedia message if it is specified in the MM4_mmbox_view.REQ message, and access permission condition information associated with the multimedia message if requested and authorized by the owner of the multimedia message. Also, if any other attributes (e.g. keywords associated with the multimedia message) are established in the MM4_mmbox_view.REQ message, these attributes may be included in the MM4_mmbox_view.RES message.

Response elements of a predetermined multimedia message, as described above, must not be returned as separate information elements in the header, but must be contained in a single list. For instance, the response elements may be contained in a single list in a single information element in the header, or a single list in the body part of the message.

In step "o", the second MMS relay/server 40 transmits an MM1_mmbox_view.RES message to the second mobile terminal 20, thereby transmits the found multimedia message to the second mobile terminal 20.

Information contained in the MM1_mmbox_view.RES message is similar to that contained in the MM4_mmbox_view.REQ message. In this case, the second MMS relay/server 40 forms a search result by merging all MM4_mmbox_view.RES messages received from different MMS relay/servers, in which the search result includes a response from the MM box of the second MMS relay/server 40 itself. For example, the second MMS relay/server 40 can merge the responses (messages) as a series of lists, which contains one list per returned multimedia message, in the body part of the message. The final and unified search result transmitted to the search requestor (i.e. the second mobile terminal 20) has the same format as that described for the MM4_mmbox_view.RES message.

While the present invention has been shown and described with reference to certain preferred embodiments thereof, it will be understood by those skilled in the art that various changes in form and details may be made therein without departing from the spirit and scope of the invention as defined by the appended claims. For instance, the present invention can be applied to a search for multimedia messages stored in a multimedia message box on the Web through the Internet, and the access permission conditions may be changed. That is, the multimedia message-related operations performed through the mobile terminals can be performed on the Web through the Internet. Accordingly, the scope of the invention is not to be limited by the above embodiments but by the claims and the equivalents thereof.

As described above, the present invention provides a mechanism for sharing and searching for multimedia messages stored in an MM box. According to the mechanism of the present invention, the MMS client has the possibility to associate an access mode ("public", "restricted", or "private") to any multimedia message stored in or uploaded to an MM box. When a multimedia message is permitted to be shared, the MMS clients who has been granted access to the multimedia message can be notified of the shared multimedia message. When the MMS client requests to view or retrieve a multimedia message, the MMS relay/server checks if the MMS client has been granted permission to access to the multimedia message. If the MMS client has been granted permission to access to the multimedia message, the MMS relay/server allows the MMS client to access the multimedia message. The present invention also provides a mechanism under which an MMS client can search for multimedia messages of other users. The search domain can be restricted to a small set of users' multimedia messages, or can be extended to all users. The MMS client, who is the owner of the multimedia message, can at any time change the access mode and notify the concerned parties accordingly.

What is claimed is:

1. A server comprising:
a transceiver; and
a controller configured to:
receive, via the transceiver from a terminal, multimedia contents,
store the multimedia contents,
receive, via the transceiver from the terminal, a request for establishing one of a plurality of access modes with respect to the multimedia contents, wherein the plurality of access modes includes a restricted mode where at least one user designated by the terminal is allowed to access the multimedia contents, and a public mode where all users are allowed to access the multimedia contents,
establish an access mode for the multimedia contents based on the request, and
transmit, if the request includes information on the at least one user, via the transceiver to the at least one user, a notification that the at least one user is allowed to access the multimedia contents, based on the information on the at least one user.

2. The server of claim 1, wherein the controller is further configured to:
receive, via the transceiver, a request for the multimedia contents from one of the at least one user.

3. The server of claim 2, wherein the controller is further configured to transmit, via the transceiver, the multimedia contents to the one of the at least one user based on the request for the multimedia contents.

4. The server of claim 1, wherein the multimedia contents and the request are received respectively or simultaneously.

5. The server of claim 1, wherein the controller is further configured to:
receive, via the transceiver, a request for the multimedia contents from one of the all users.

6. The server of claim 5, wherein the controller is further configured to transmit, via the transceiver, the multimedia contents to the one of the all users.

7. The server of claim 1, wherein the plurality of access modes includes a private mode where only a user of the terminal is allowed to access the multimedia contents.

8. The server of claim 1, wherein the controller is further configured to, if a change request to change the access mode for the multimedia contents is received from the terminal, change the access mode for the multimedia contents based on the change request.

9. A method for sharing multimedia contents, by a server, the method comprising:
receiving, from a terminal, multimedia contents,
storing the multimedia contents, and
receiving, from the terminal, a request for establishing one of a plurality of access modes with respect to the multimedia contents, wherein the plurality of access modes includes a restricted mode where at least one user designated by the terminal is allowed to access the multimedia contents, and a public mode where all users are allowed to access the multimedia contents,
establishing an access mode for the multimedia contents based on the request, and
if the request includes information on the at least one user, transmit, to the at least one user, a notification that the at least one user is allowed to access the multimedia contents, based on the information on the at least one user.

10. The method of claim 9, further comprising:
receiving a request for the multimedia contents from one of the at least one user.

11. The method of claim 10, further comprising:
transmitting the multimedia contents to the one of the at least one user based on the request for the multimedia contents.

12. The method of claim 9, wherein the multimedia contents and the request are received respectively or simultaneously.

13. The method of claim 9, further comprising:
receiving a request for the multimedia contents from one of the all users.

14. The method of claim 13, further comprising:
transmitting the multimedia contents to the one of the all users.

15. A terminal comprising:
an input unit;
a transceiver; and
a controller configured to:
transmit multimedia contents via the transmitter to a server,
detect, via the input unit, an input for a request to establish one of a plurality of access modes with respect to the multimedia contents, and
transmit, via the transceiver to the server, the inputted request,
wherein the plurality of access modes includes a restricted mode where at least one user included in the request is allowed to access the multimedia contents, and a public mode where all users are allowed to access the multimedia contents.

16. The terminal of claim 15,
wherein the multimedia contents and the request are transmitted respectively or simultaneously.

17. The terminal of claim 15, wherein the plurality of access modes includes a private mode where only a user of the terminal is allowed to access the multimedia contents.

18. The terminal of claim 15, wherein the controller is configured to:
detect, via the input unit, an input for a change request to change the access mode for the multimedia contents, and
transmit the change request via the transceiver to the server.

19. A method for sharing multimedia contents, by a terminal, the method comprising:
transmitting multimedia contents via the transceiver to a server;
detecting an input for a request to establish one of a plurality of access modes with respect to the multimedia contents, and
transmitting, to the server, the inputted request,
wherein the plurality of access modes includes a restricted mode where at least one user included in the request is allowed to access the multimedia contents, and a public mode where all users are allowed to access the multimedia contents.

20. The method of claim 19,
wherein the multimedia contents and the request are transmitted respectively or simultaneously.

* * * * *